(12) United States Patent
Nagpal et al.

(10) Patent No.: US 12,348,497 B2
(45) Date of Patent: Jul. 1, 2025

(54) PRIVACY PRESERVING IDENTITY RESOLUTION VIA PAGE CONTENT

(71) Applicant: MICROSOFT TECHNOLOGY LICENSING, LLC, Redmond, WA (US)

(72) Inventors: Sarvesh Nagpal, Redmond, WA (US); Swaathee Radhakrishnan, Redmond, WA (US); Ravi Theja Yada, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 216 days.

(21) Appl. No.: 17/982,169

(22) Filed: Nov. 7, 2022

(65) Prior Publication Data

US 2024/0154941 A1    May 9, 2024

(51) Int. Cl.
*H04L 9/40* (2022.01)
*H04L 9/32* (2006.01)
*H04L 29/06* (2006.01)

(52) U.S. Cl.
CPC ........ *H04L 63/0421* (2013.01); *H04L 9/3236* (2013.01); *H04L 63/18* (2013.01); *H04L 63/20* (2013.01)

(58) Field of Classification Search
CPC ..... H04L 63/0421; H04L 63/20; H04L 63/04; H04L 63/0407; H04L 63/0414; H04L 63/14; H04L 63/1408
See application file for complete search history.

(56) References Cited

U.S. PATENT DOCUMENTS

| 2008/0162206 A1* | 7/2008 | Mak ................... G06Q 30/0255 705/14.53 |
| 2018/0034850 A1 | 2/2018 | Turgeman |
| 2019/0124082 A1* | 4/2019 | Mazouchi ............. H04L 9/3239 |

OTHER PUBLICATIONS

"Clarity", Retrieved from: https://web.archive.org/web/20220824015722/https://clarity.microsoft.com/, Aug. 24, 2022, 7 Pages.
"Tapad: Hashed Email", Retrieved from: https://web.archive.org/web/20211118073436/https://www.tapad.com/solutions/hashed-email, Nov. 18, 2021, 3 Pages.
Privy, Admin, "What is a Hashed Email and Why Should Marketers Care?", Retrieved from: https://www.privy.com/blog/what-is-a-hashed-email-and-why-should-marketers-care#:~:text=In%20other%20words%2C%20a%20hashed,address%20becomes%20a%20digital%20passport, Aug. 11, 2015, 3 Pages.
Schiff, Allison, "Neustar is Latest to Roll out a Cookieless ID", Retrieved from: https://www.adexchanger.com/online-advertising/neustar-is-latest-to-roll-out-a-cookieless-id/#:~:text=Third%2Dparty%20cookies%20are%20going,deterministic%20identifiers%20of%20its%20own, Dec. 16, 2020, 4 Pages.
(Continued)

*Primary Examiner* — Edward Zee
(74) *Attorney, Agent, or Firm* — Shook, Hardy & Bacon L.L.P.; Joseph W. Cruz

(57) ABSTRACT

Various embodiments discussed herein are directed to improving existing technologies by extracting or detecting identifiers from a page, regardless of the device or platform a user is using, and then anonymizing such identifiers to determine if the same user accessed different pages or if the current user of a current computer session is a same user as in past computer sessions.

19 Claims, 11 Drawing Sheets

(56) References Cited

OTHER PUBLICATIONS

Zawadziński, et al., "Identity in AdTech: Meet the Various Universal ID Solutions [Updated 2022]", Retrieved from: https://clearcode.cc/blog/adtech-id-solutions/, Jun. 9, 2022, 28 Pages.
International Search Report and Written Opinion received for PCT Application No. PCT/US2023/033683, mailed on Dec. 22, 2023, 14 pages.

* cited by examiner

PRIVACY PRESERVING IDENTITY RESOLUTION VIA PAGE CONTENT

BACKGROUND

Various computer-implemented technologies track, over a computer network, user devices and activities across different web sessions. For example, some technologies use cookies, which are typically small text files that are stored to a user device by a web browser at the request of a particular web server. Cookies can be used to perform a variety of actions, such as store and maintain user preferences for a website, store log-in details, determine who is a new or returning visitor, and the like.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein are directed to improving existing technologies by extracting or detecting one or more identifiers (e.g., a phone number, an email address, or credit card number) from a page (e.g., a web page) regardless of the device or platform a user is using and then anonymizing (e.g., hashing) such identifiers, which may be unique, to determine if a same user accessed different pages across different computer sessions. For example, during a first computer session, a first user may visit mobile application A on their mobile phone. During such first computer session, the user may input, at a first app page, a shipping address while electronically purchasing a product. Subsequently, during a second computer session, the same first user may visit web application C using web browser D hosted on their desktop computer. During this second computer session, the first user may enter the same shipping address at a web page.

Existing technologies are unable to detect that the same first user was engaged in these different computer sessions because they are device or platform specific, among other reasons. However, particular embodiments described herein anonymize (e.g., generate a one-way hash of) the shipping address (and/or other identifiers, which may be unique). Such anonymized identifiers act as a pseudonymous identifier that stays consistent across all platforms and devices without explicitly identifying the user. These anonymized values allow particular embodiments to associate the first computer session and second computer session without ever knowing the actual shipping address or the identity of the associated user. Some embodiments generate a score indicating a probability that a same user accessed page content from the multiple sessions based at least in part on comparing anonymized identifiers detected across the multiple sessions. Such functionality has the technical effects of improved process security, improved accuracy or error rate reduction for tracking users, increased scalability, improved human interaction, and improved computer resource consumption, among other technical effects.

BRIEF DESCRIPTION OF THE DRAWINGS

The present invention is described in detail below with reference to the attached drawing figures, wherein.

DETAILED DESCRIPTION

Figure 1:
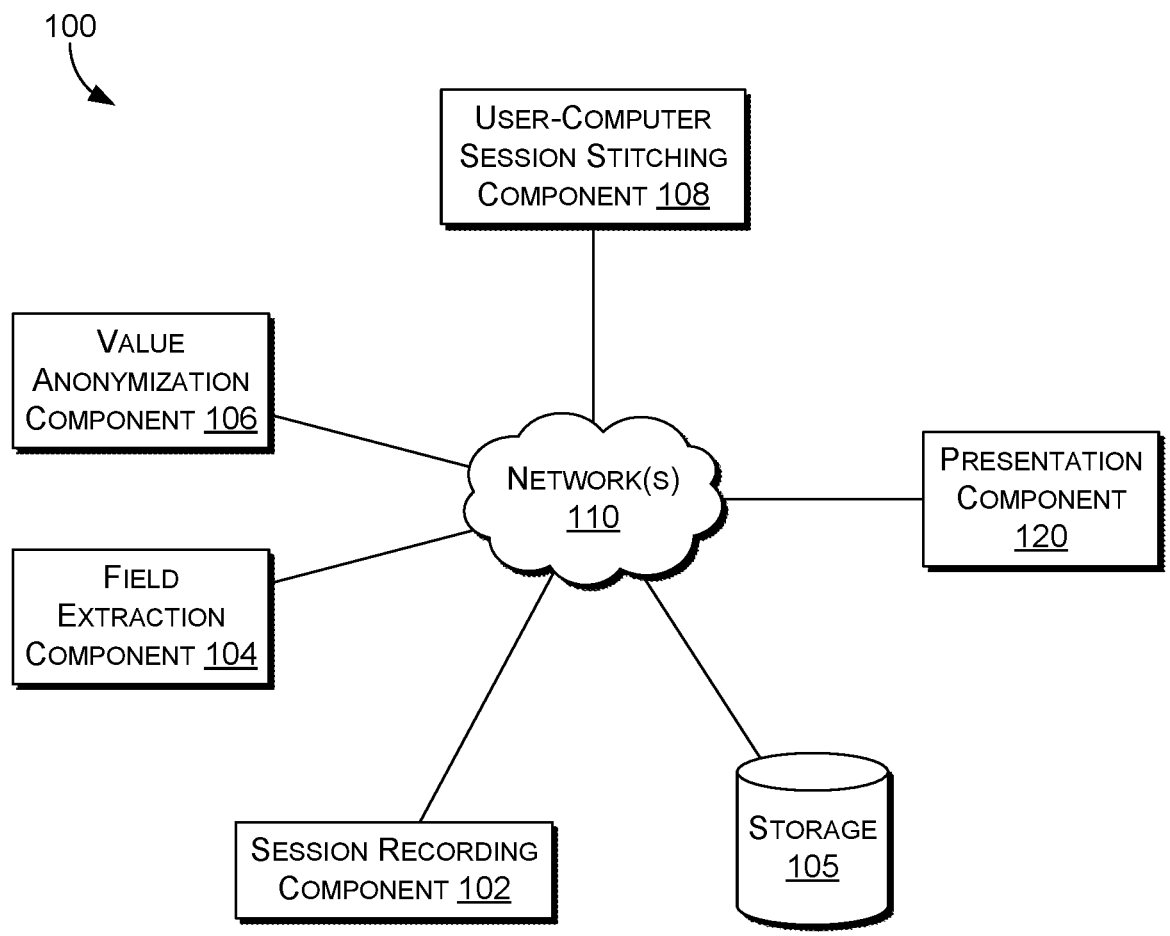
FIG. 1 is a block diagram depicting an example computing architecture suitable for implementing some embodiments of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

Existing tracking technologies, such as third-party cookies, are becoming obsolete. As discussed above, cookies can be used to track user devices. There are multiple types of cookies, such as first-party cookies and third-party cookies. "Third-party" cookies are created and placed by web applications other than the web application a user is visiting to perform particular actions, such as cross-site tracking, ad serving, and retargeting. Third-party cookies typically work by embedding JavaScript from one web application into another. Third-party cookies store data remembered between browsing sessions. First-party cookies, on the other hand, are generated by the host domain the user is currently visiting. However, various technologies are eliminating third-party cookies (referred to as "cookie deprecation") and other data objects due to various concerns, such as user privacy. This is because user IDs are typically directly derived and these cookies follow users from one network site to another, which many users feel is intrusive.

Without cookies, existing technologies incorporate functionality that is associated with less accuracy or increased error rates for tracking users. For example, some technologies only consider static metadata, such as IP address of the user device, User Agent data (i.e., web browser name, operating system ID, and device type) or screen resolution of the device a user is currently using. However, the accuracy of tracking a user is extremely low with these and some cookie-based technologies. This is because with the emergence of unique user devices (e.g., smart watches, wearable devices, mobile phones, etc.), the same users tend to navigate the web using different devices or different platforms (e.g., different operating systems, different browsers, web applications that run on a browser versus mobile applications that do not require a browser, etc.). For example, solutions that simply track an IP address of a user device may be unable to track a user across different sessions because the user may use a different device (and thus a different IP address) over multiple sessions. In another example, for a user using a local native mobile application, User Agent data may not be able to be extracted since it requires the user to use a web browser. This leads to further inaccuracies depending on the application use case, such as sending an irrelevant ad for retargeting, reduced ability to maintain user preferences for a particular website, reduced ability to determine if a user is a new or returning visitor, reduced ability to store log-in details (e.g., username and passphrase), and the like.

Relatedly, existing technologies are also not scalable. In order to track users, web application owners typically have to configure their own data objects (e.g., cookies) that conform to specific platforms or other parameters. For example, data objects that record user activity may require that the user uses a specific web browser since the data object is located with (or communicates with) the specific web browser. In another example, some data objects only record user activity using specific operating systems. Accordingly, tracking users is not scalable to more users outside of these parameter restrictions.

Because some of these technologies are not scalable or require specific parameters to be configured, manual user input is still required with these solutions, which not only negatively impacts user interaction, but unnecessarily consumes computer resources. For example, a user using a local mobile app will often be required to re-enter their login-credentials for each session because cookie or other data object technologies fail to track user activity when the user is not using a browser. Accordingly, the user is often left frustrated because they have to repeatedly input such information, thereby negatively impacting the user experience. At a computational level, such manual computer user input leads to repetitive I/O costs (e.g., excess physical read/write head movements on non-volatile disk) because each time an operating system or other component processes a user request to store or access user credentials (or other information, such as user preferences), the user device has to reach out to the storage device to perform a read or write operation, which is expensive because it is error prone and eventually wears on components, such as a read/write head. Moreover, each repetitive input also requires the data to be saved to memory, thereby unnecessarily consuming storage space.

Various embodiments of the present disclosure provide one or more technical solutions that have technical effects in light of these technical problems, as well as other problems, as described herein. For instance, particular embodiments are directed to extracting identifiers from page content regardless of the device or platform a user is using and then anonymizing (e.g., hashing) such identifiers to determine if a same user accessed different pages across different computer sessions. In some implementations, the identifiers are unique or substantially unique to the user. For example, during a first computer session, a first user may visit mobile application A on their mobile phone, which includes operating system B. During such first computer session, the user may subscribe to mobile application A by entering their email address (e.g., John.doe@email.com) at a first app page. Subsequently, during a second computer session, the same user (the first user) may visit web application C using web browser D hosted on their desktop computer. During this second computer session, the first user may purchase a product, and use the same email address (e.g., John.doe@email.com) at a web page. Existing technologies have no way to connect web browser D/web application C with the first user's mobile phone/mobile application A (or operating system B). However, particular embodiments anonymize (e.g., generate a one-way hash of) the email address (among other data). Such anonymized values thus act as a pseudonymous identifier that stays consistent across all platforms and devices. These anonymized values allow particular embodiments to stich the first computer session and second computer session together without ever knowing the actual e-mail address or the identity of the associated user. In other words, particular embodiments generate a score indicating a probability that a same user accessed page content from multiple sessions based at least in part on comparing anonymized identifiers across multiple sessions.

Particular embodiments improve user privacy or have the technical effect of improved process security relative to existing technologies. In some embodiments, this is because cookies are not used at all. Moreover, unlike particular cookies, particular embodiments do not directly derive user IDs. Accordingly, one technical solution is the concept extracting particular values of particular fields or otherwise extracting unique identifiers associated with the user that do not directly identify the user but are still unique enough not to be redundant among a lot of users. For example, in some instances, such unique identifier or value includes an email address of a particular user, a zip code of a particular user, a postal address of a particular user, a credit card number, and/or a particular user.

Another technical solution for improved process security is the concept of causing anonymization (e.g., via encryption, obfuscation, or masking) of such values or unique identifiers. Accordingly, sensitive user information, such as phone numbers, email addresses, or credit card information cannot (or is less likely to) be discovered. Consequently, cyber attackers are unable to programmatically gain access to resources (e.g., a bank account or other accounts) because the anonymized data will be too obfuscated to make sense of it. Another related technical solution for improved process security is the concept of performing the actual anonymization at a client application (e.g., a web browser, an extension, or app plugin) of a user device. In other words, the user device performs the anonymization instead of a remote server in some embodiments. In this way, plaintext sensitive information, such as a credit card number, is not transmitted across a computer network to a remote server. Therefore, it is impossible or less likely for cyber attackers to sniff plaintext data during the transmission or decreases the likelihood that the data will be discovered, since it can be stored to the remote server in an anonymized form, as opposed to plaintext.

Particular embodiments also improve the accuracy or error rates for tracking users relative to existing technologies. Instead of only considering static metadata that is device or platform specific, particular embodiments additionally or alternatively extract page content to track users regardless of the device or platform a user is using. Accordingly, one technical solution is extracting a set of values of one or more fields from a web or app page or the detection of unique identifiers. Additionally or alternatively, another technical solution is then generating a score indicating a probability that a same user accessed both a first web or app page and a second web or app page based on, at least in part, a comparison between anonymized data (representing the extracted set of values). This has the technical effect of reducing error rates for tracking users because extracting page information for tracking users is device and platform agnostic, which means that users are more likely to be tracked across multiple computer sessions. Both technical solutions, either in isolation or in combination, lead to further accuracies depending on the application use case, such as sending a relevant ad for retargeting, an increased ability to maintain user preferences for a particular website, an increased ability to determine if a user is new or a returning visitor, an increased ability to store log-in details (e.g., username and passphrase), and the like. This is because extracting page content for tracking users is device or platform agnostic such that all user activity will be captured across all computer sessions, even when users use different devices or platforms.

Particular embodiments are also more scalable relative to existing technologies. There is no need for web application owners to configure their own data object, such as cookies, to conform to specific parameters. This is because particular embodiments run code (e.g., JavaScript) when a user is on a site, which captures the whole Document Object Model (DOM) (or other data object) that captures the logical structure of a page/document, and then these embodiments serialize the DOM according to the order the computer user activity is performed. This records exactly what the user was seeing and/or doing, and does so without respect to platform or device type of the user. Accordingly, one technical solution is employing functionality that captures the logical structure of a page/document according to the order the computer user activity is performed. Accordingly, there is no need for a specific web browser, operating system, and the like. Therefore, tracking users is more scalable relative to existing technologies.

Particular embodiments also improve human interaction and computer resource consumption based on scalability or being device and platform agnostic. As described above, particular embodiments are more scalable relative to existing technologies and thus do not require as much manual user input, which improves user interaction and reduces computer resource consumption. For example, using the illustration above, a user using a local mobile app will not be required to re-enter their login-credentials for each session because particular embodiments track user activity even when the user is not using a particular browser. Accordingly, the user experience is not as tedious because users do not have to repeatedly input such information. At the computational technical effect level, such reduced manual computer user input leads to fewer I/O costs (e.g., fewer physical read/write head movements on non-volatile disk) because an operating system or other component processes a user request to put in user credentials or other information fewer times. This means that the user device has to reach out to the storage device fewer times to perform a read or write operation. Accordingly, these embodiments are less error prone and wear less on a read/write head or other storage device components. Moreover, less manual computer user input means that less data is written to local memory, thereby increasing storage capacity.

Turning now to FIG. 1, a block diagram is provided showing aspects of an example computing system architecture suitable for implementing some embodiments of the disclosure and designated generally as system 100. The system 100 represents only one example of a suitable computing system architecture. Other arrangements and elements can be used in addition to or instead of those shown, and some elements may be omitted altogether for the sake of clarity. Further, as with system 100, many of the elements described herein are functional entities that are implemented as discrete or distributed components or in conjunction with other components, and in any suitable combination and location according to various embodiments.

Example system 100 includes network(s) 110, which is described in connection to FIG. 10, and which communicatively couples components of system 100 including the session recording component 102, the field extraction component 104, the value anonymization component 106, the user-computer session stitching component 108, the presentation component 120, and storage 105. In some embodiments, these components are embodied as a set of compiled computer instructions or functions, program modules, computer software services, or an arrangement of processes carried out on one or more computer systems, such as computing device 11 described in connection to FIG. 11, and the user device 02*a* and/or the server 06 of FIG. 10, for example.

In some embodiments, the functions performed by components of system 100 are associated with one or more personal assistant applications, services, or routines. In particular, such applications, services, or routines can operate on one or more user devices (such as user device 02*a* of FIG. 10), servers (such as server 06 of FIG. 10), can be distributed across one or more user devices and servers, or be implemented in the cloud. Moreover, in some embodiments, these components of system 100 are distributed across a network, including one or more servers (such as server 06 of FIG. 10) and client devices (such as user device 02*a* of FIG. 10), in the cloud, or reside on a user device, such as user device 02*a* of FIG. 10. Moreover, these components, functions performed by these components, or services carried out by these components are implemented at appropriate abstraction layer(s) such as the operating system layer, application layer, and/or hardware layer of the computing system(s). Alternatively, or in addition, in some embodiments, the functionality of these components and/or the embodiments described herein are performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs). Additionally, although functionality is described herein with regards to specific components shown in example system 100, it is contemplated that in some embodiments functionality of these components are shared or distributed across other components.

Continuing with FIG. 1, the session recording component 102 is generally responsible for listening (e.g., capturing or recording) to and storing, in computer storage (e.g., RAM or disk), different computer user activity and/or different pages (and their content) a user has interacted with during a given computer session regardless of the device or platform. For example, the session recording component 102 captures the user clicking on the same button X on page Y a particular quantity of times, where both page Y, its content, and the user clicks on button X are recorded. "Computer user activity," as described herein, refers to any suitable user computer input, such as clicks, views, purchases, scrolls, drilling, keyboard input (of natural language letters, words, numbers, or symbols), drags, and the like. A "page" as described herein refers to any suitable instance of an entire computer application workflow, such as a particular web page of a web application, a particular app page (e.g., an "activity" in ANDROID) of an application, a user interface instance (e.g., a screen), a window in a desktop application, or the like. In some embodiments, the session recording component 102 stores such information as an individual data record (e.g., a database row), where the key or unique identifier is a session ID, so that user privacy is preserved. Accordingly, the session recording component 102 has permissions to listen to page content and computer user activity made by users on such page.

In some embodiments, the session recording component 102 functions by extracting computer user activity and page interaction from the perspective of the user in the order the user engages in such computer user activity and page interaction. In an illustrative example, some embodiments run JavaScript (or other computer programming language) when a user is on a web application (or other application), which captures the whole Document Object Model (DOM) (or other data object that captures the logical structure of a page/document), serializes the DOM according to the order of the computer user activity is performed, and then sends to a server. This captures exactly what the user was seeing and/or doing and when. A "DOM" as described herein refers to an application programming interface (API) for HTML and XML web documents. The DOM defines the logical structure of documents and the way a document is accessed and manipulated by users, such as via computer user activity. A web page is a document that is either displayed in the browser window or as the HTML source. In both cases, it is the same document but the DOM representation allows it to be manipulated. As an object-oriented representation of the web page, it can be modified with a scripting language such as JavaScript.

Examples of programs that include the functionality of the session recording component 102 according to some embodiments is CLARITY®, developed by MICROSOFT® of Redmond, Washington. CLARITY is a tool that captures how users actually use a website or application. CLARITY automatically generates heat maps for all pages to view where people click on the page, what they ignore (e.g., via a cool color, as opposed to a red color indicating high quantity of clicks) on the page, and how far they scroll on a page.

CLARITY also performs an actual session recording to get a step-by-step view (from the perspective of the user) of how users are engaging in computer user activity across sessions. In other words, CLARITY records/stores each page a user accesses (and all of its content), how they are interacting with such page (e.g., selecting particular buttons), when they are performing such computer user activity, and where, on the page, they are interacting, all in the order the user is performing it. Put differently, an actual computer session recording includes recording multiple visual snapshots or screenshots of the entire user's session, which includes each page a user navigated to and all of the computer user activity the user performed on each page. Consequently, in some embodiments, the field extraction component 104 "re-plays" such actual recording to view what the user was seeing and doing with respect to computer user activity, i.e., to detect each value of each page the user navigated. CLARITY also offers other powerful insights, such as "dead clicks" (e.g., click with no effect), "rage clicks," (e.g., user rapidly clicked in same area or UI element), and the like.

In some embodiments, the session recording component 102 performs its functionality in alternative or additional ways. For example, some embodiments use any suitable software tracking tool. In another example, in some embodiments, the session recording component 102 is included as an extension to a browser, which records session data across all web sessions.

The field extraction component 104 is generally responsible for doing a computer search for and/or detecting specific content (e.g., fields and/or corresponding values or unique identifiers) of the page(s) recorded by the session recording component 102. For example, during a first session, a user may have inputted a phone number to a page. The field extraction component 104 subsequently detects such phone number and predicts, via a probability score, that it is a phone number, as opposed to another type of value, such as a credit card. In some embodiments, the field extraction component 104 only selects certain content of a page for downstream processing (processing by the components 106 and 108) while disregarding other pieces content on the same page. For example, in some embodiments, in order to select which values get hashed via the value anonymization component 106, the field extraction component 104 searches for and/or selects content that is more indicative of being an identifier that is unique to a user (a unique identifier), and the non-extracted content is more likely to be shared by multiple users or not the same user between two or more sessions. For example, in some embodiments, the field extraction component 104 searches for and detects credit card numbers, phone numbers, email addresses, and the like that a user has typed in via computer user activity, which is more likely to be unique to a single user and consistent across sessions. Such information is then passed to the value anonymization component 106 and the user-computer session stitching component 108, as described in more detail below.

In some embodiments, the field extraction component 104 additionally disregards other field values on a page for downstream processing, such as a "total cost" amount, a date, and the like, since these values are not indicative of an identity of a user and are not likely to be entered or consistent across future sessions. Computer applications and pages can be vastly different and contain unique information. However, certain fields and values tend to be consistent across applications, such as the requirement for users to input credit card numbers, phone numbers, email addresses and the like. Accordingly, in some embodiments, the field extraction component 104 searches for or selects these fields and/or unique identifiers for downstream processing, and disregards or does not search for other fields and/or values.

In some embodiments, the field extraction component 104 performs its functionality via one or more machine learning models to learn which specific fields and/or values to extract and/or which specific fields/values to disregard based on training the model to understand what a particular field or value looks like and/or where the different fields/values tend to be located (e.g., via the DOM structure), as described in more detail below. In this way, a machine learning model can learn to distinguish unique identifiers. For example, some embodiments use a Bidirectional Encoder Representation from Transformers (BERT), which is fine-tuned to recognize particular fields and/or that particular values belong to or are constituents of a respective field, as described in more detail below.

In some embodiments, the field extraction component 104 assigns the type of site or page a user has accessed, which dictates what fields and/or values the field extraction component 104 searches for or considers. For example, in response to receiving an indication that the user has accessed an electronic marketplace web application or page (e.g., a checkout page), the field extraction component 104 searches for a "credit card" number value/field, a "shipping address" field/value, and/or a "billing address" value/field. Such functionality is therefore governed by programmatic rules and conditions that trigger searches of specific content.

In some embodiments, the page(s) recorded by the session recording component 102 includes file attachments (e.g., PDF files) or other data objects that are not immediately machine-readable. In these embodiments, the field extraction component 104 performs Optical Character Recognition (OCR) or other computer vision functionality via an OCR module (not shown) to convert human natural language text into computer-readable text. In an OCR context, the field extraction component 104 detects natural language characters (e.g., words and numbers) in a document and converts such characters into a machine-readable format so that further analysis can occur with respect to the value anonymization component 106 and the user-computer session stitching component 108. A "document", as described herein, refers to a digital image or other data object that contains one or more natural language characters, such as numbers, English words, or English phrases. In some instances, a document represents or first exists as a real world paper/document or other medium, which has been copied or scanned.

In some embodiments, a processor executing the OCR module first converts (e.g., via PymuPDF) one or more raw documents into another format in preparation for further processing by the OCR module. For example, the OCR module converts any document (e.g., a JPEG document) that is not an image into an image (e.g., a bitmap image) of black and white pixel values, where the dark areas are identified as characters that need to be recognized and light areas are identified as background). Often, information is difficult to extract in certain formats (e.g., JPEG) and/or the original formats consume unnecessary computer memory resources. Accordingly, data can be converted from one format to another in order to extract all features of a document, save on memory resources, and the like all while maintaining high image quality. For example, the OCR module can automatically convert a PDF document of several pages into an image file output format (e.g., JPG, PNG, BMP, TIFF, etc.), such as via a PDF-to-JPG converter. JPEG, for example, is a file format that can contain image with 4:1 to 10:1 lossy image compression technique via conversion. With this compression technique, embodiments reduce the image size of images contained within PDF documents without losing the image quality.

In some embodiments, the OCR module additionally or alternatively performs image quality functionality to change the appearance of the document by converting a color document to greyscale, performing desaturation (removing color), changing brightness, and changing contrast for contrast correctness, and the like. Responsively, in some embodiments, the OCR module performs a computer process of rotating the document image to a uniform orientation, which is referred to as "deskewing" the image. From time to time, user-uploaded documents are slightly rotated or flipped in either vertical or horizontal planes and in various degrees, such as 45, 90, and the like. Accordingly, some embodiments deskew the image to change the orientation of the image for uniform orientation (e.g., a straight-edged profile or landscape orientation). In some embodiments, in response to the deskew operation, some embodiments remove background noise (e.g., via Gaussian and/or Fourier transformation). In many instances, when a document is uploaded, such as through scanning or taking a picture from a camera, it is common for resulting images to contain unnecessary dots or other marks due to the malfunction of printers. In order to be isolated from the distractions of this meaningless noise, some embodiments clean the images by removing these marks. In response to removing the background noise, some embodiments extract the characters from the document image and place the extracted characters in another format, such as JSON. Formats, such as JSON, can be used as input for other machine learning models, such as lightweight modified BERT models for language predictions, as described in more detail below.

In some embodiments, the field extraction component 104 additionally (or alternatively) includes an object detection module to detect the document or objects (e.g., a "credit card" field) in the document or page (e.g., via a machine learning model). For example, in some embodiments, in response to (or prior to) the OCR module performing its functionality, text and object detection can be performed to convert 2D grayscale images to structured text associated with their bounding boxes and coordinates. For example, some embodiments use computer vision, object detection, and/or image classification techniques (e.g., by implementing a Convolutional Neural Network (CNN)). In an illustrative example of object detection functionality, particular embodiments use one or more machine learning models (e.g., a CNN) to generate a bounding box that defines the boundaries and encompasses a computer object representing a feature (e.g., a phone number value, an email address value, etc.) of a document or the document itself. These machine learning models can also generate a classification prediction that the computer object is a particular feature. In computer vision applications, the output of object detection can be encompassed by a bounding box.

A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in documents or the document itself. In an illustrative example, a first bounding box is generated over a table of a document, which triggers an image capture or OCR of a document. In another example, a second bounding box is generated over a "total amount" indicia and labeled "amount", and a third bounding box is generated over an object (e.g., a mountain image) and labeled "mountain," as indicated in a logo, for example.

In some embodiments, a processor executing the OCR module of the field extraction component 104 detects or extracts each word and/or number of values in a document via any suitable functionality, such as via pattern recognition and/or feature detection. With respect to pattern recognition, the OCR module is fed examples of natural language text in various fonts and formats, which are then used to compare, and recognize, characters in the scanned document. With respect to feature detection, the OCR module applies rules regarding the features of a specific letter or number to recognize characters in the scanned document. Features could include the number of angled lines, crossed lines, curves, or the like in a character for comparison. For example, the capital letter "A" may be stored as two diagonal lines that meet with a horizontal line across the middle. In some embodiments, the output of the OCR module is each extracted field and/or value of a document and an address (e.g., X and Y coordinates) of each extracted value and/or field in the document. A "field" as described herein refers to a category, attribute, column, or data type that is typically represented in natural language (but in some instances is not visible). For example, a document can include a "phone number" field and a corresponding value. A "value" is a specific natural language indicator, number, and/or symbol that belongs to or is a constituent of a particular field. For example, the phone number value of the "phone number" field described above may be "480-276-7179." In some embodiments, the output of the OCR module is each field and value for further downstream processing, as described in more detail below.

The value anonymization component 106 is generally responsible for causing the content extracted by the field extraction component 104 to be anonymized. Data that is "anonymized" is data where at least one value is changed, and where the output data, although different in substance than the input, still represents the input. For example, an email address John.smith@email.com is hashed to the value "8acsqfn3v," which still represents the email address, even though the payload values are completely different. Anonymized values represent any value that has been obfuscated, encrypted, hashed, or otherwise changed. Some embodiments then bucket the data after it has been anonymized. To bucket data is to reserve a particular amount of memory that holds a single item (e.g., a single hash value) or multiple items of data (e.g., combined hashes).

In some embodiments the value anonymization component 106 anonymizes content of pages via any suitable hashing algorithm, such as via a one-way hash. A one-way hash function (e.g., a message digest), is a mathematical function that takes a variable-length input string and converts it into a fixed-length binary sequence that is computationally difficult to invert; that is, generate the original string from the hash. In other words, a one-way hash function is a mathematical function that generates a fingerprint of the input, but there is typically no way to compute the original input. If the input is the same, then the hash is always the same. If the input changes at all, even by one character, the output hash is typically different. In this way, hashes will not be able to be tied back to a user. In some embodiments, a hash is used to verify that input A is identical to input B but cannot be used to get the input back from the output like with another mathematical function, encryption. Example hashing algorithms that the value anonymization component 106 includes are checksums, universal hash function families, cyclic redundancy checks, non-cryptographic hash functions, keyed cryptographic hash functions, and unkeyed cryptographic functions.

In some embodiments, the value anonymization component 106 resides server side and/or client side. For example, in some embodiments, the value anonymization component 106 causes anonymization by instructing, over the computer network 110, a client application at a user device to perform the anonymization but the value anonymization component 106 is not performing the anonymization itself. In another example, the value anonymization component 106 causes anonymization by directly performing the anonymization function (e.g., at the client side) itself.

The user-computer session stitching component 108 is generally responsible for generating a score (e.g., a confidence level) indicating a probability that a same user has accessed content in different computer sessions (or different pages regardless of the computer session). In some embodiments, such functionality is based at least in part on comparing hashes of different pages and sessions, as performed by the value anonymization component 106. Accordingly, in some embodiments, the user-computer session stitching component 108 makes a programmatic call to the value anonymization component 106, which then fetches, from computer storage, data records indicating different sessions and hash values and then returns such records or hash values to the user-computer session stitching component 108 for comparison.

In some embodiments, the user-computer session stitching component 108 additionally or alternatively generates its score via one or more machine learning models, as described in more detail below. For example, in some embodiments, a machine learning model takes, as input, a combination of particular field values (e.g., a phone number, a credit card number, a zip code, an email address, a residential address) of each page of multiple computer sessions and other signals, such as IP address, screen resolution, and the like, in order to learn node activation/deactivation weights for predictions that a same user accessed content in multiple computer sessions. For example, for multiple sessions that represent navigation by a single user, a model learns that the field (or its hash) that changed the least (most indicative of user identity) across different sessions is a phone number (node activation), whereas other fields, such as IP address, changed considerably between sessions (node deactivation) because the same user tends to use different devices across multiple sessions. Accordingly, nodes representing phone number is weighted higher for prediction and nodes representing IP address is weighted lower. In other words, a same phone number entered by a user across multiple computer sessions is more indicative that the same user accessed content from both computer sessions and different IP addresses detected from multiple sessions is not as indicative that there were different users accessing content from different computer sessions.

Alternatively or additionally, in some embodiments, the user-computer session stitching component 108 generates its score at least partially by using arithmetic, difference, or overlap algorithms that indicate the differences between the anonymized values. For example, in some embodiments, the user-computer session stitching component 108 uses a Jaccard Index to determine the overlap (i.e., union) of characters between the compared anonymized values. For example, using the illustration above, each character in the hash "Hext5" is compared with each character in the hash "Hext5Rj9804," where the overlap or similarity is a total of 5 characters (i.e., "Hext5" between the two hashes. The higher the quantity of characters of overlap between multiple anonymized values or have union (Jaccard Index), the higher the score or probability that the same user accessed content across multiple computer sessions.

Figure 4:
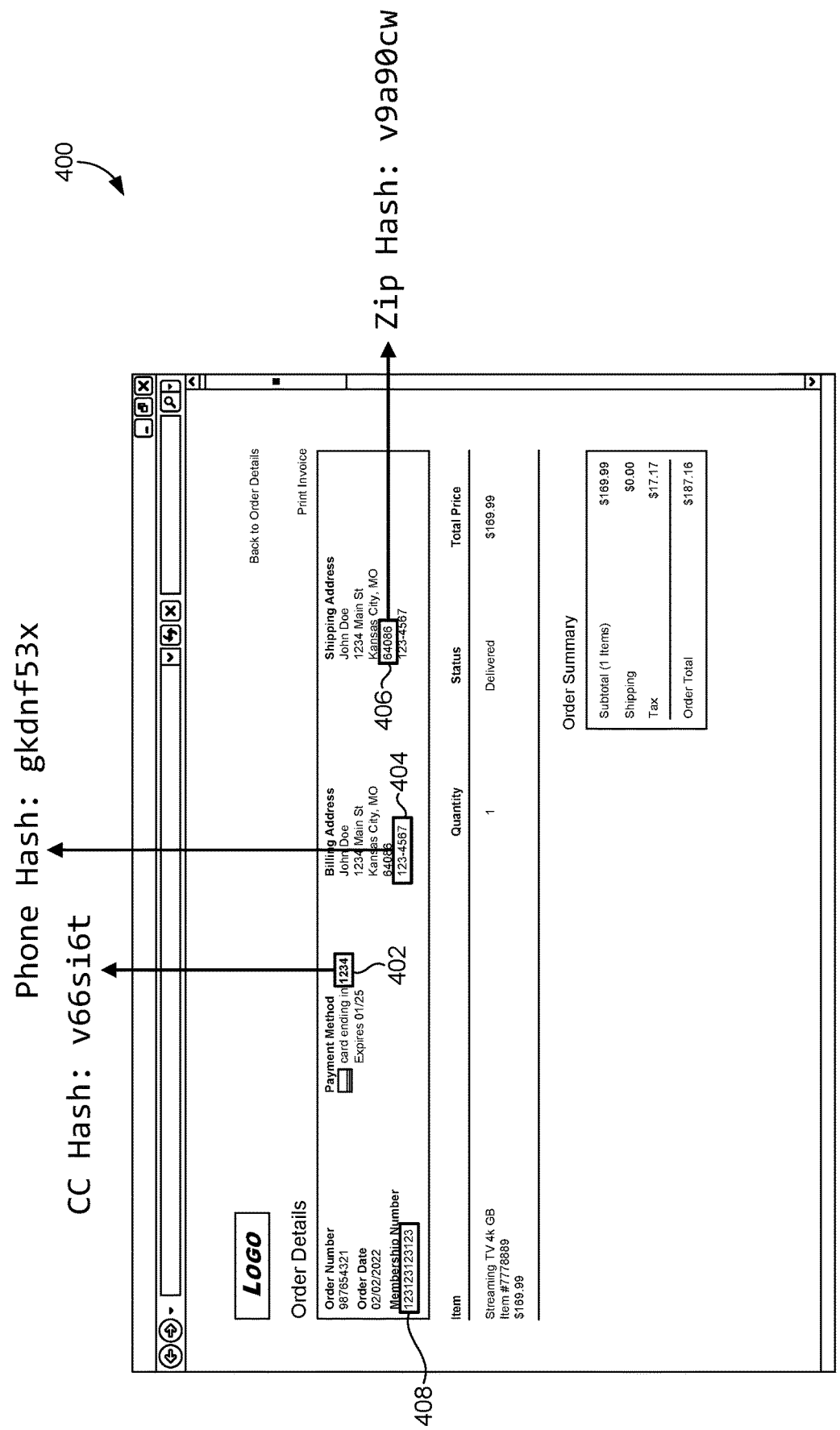
FIG. 4 is a screenshot of an example page illustrating particular field values that can be hashed, according to some embodiments.

Example system 100 also includes a presentation component 120 that is generally responsible for causing presentation of content and related information to a user, such as web or app pages and their sitemap elements (e.g., as illustrated by the screenshot 400 of FIG. 4). In some embodiments, the presentation component 120 comprises one or more applications or services on a user device, across multiple user devices, or in the cloud. For example, in one embodiment, presentation component 120 manages the presentation of content to a user across multiple user devices associated with that user. Based on content logic, device features, associated logical hubs, inferred logical location of the user, and/or other user data, presentation component 120 may determine on which user device(s) content is presented, as well as the context of the presentation, such as how (or in what format and how much content, which can be dependent on the user device or context) it is presented and/or when it is presented. In particular, in some embodiments, presentation component 120 applies content logic to device features, associated logical hubs, inferred logical locations, or sensed user data to determine aspects of content presentation.

In some embodiments, presentation component 120 generates user interface features (or causes generation of such features) associated with pages. Such features can include user interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, a personal assistant service or application operating in conjunction with presentation component 120 determines when and how to present the content. In such embodiments, the content, including content logic, may be understood as a recommendation to the presentation component 120 (and/or personal assistant service or application) for when and how to present the notification, which may be overridden by the personal assistant app or presentation component 120.

Example system 100 also includes storage 105. Storage 105 generally stores information including data, computer instructions (for example, software program instructions, routines, or services), data structures, and/or models (e.g., the neural network 605 and the modified BERT model of FIG. 5) used in embodiments of the technologies described herein. In some embodiments, storage 105 represents any suitable data repository or device, such as a database, a data warehouse, RAM, cache, disk, RAID, and/or a storage network (e.g., Storage Area Network (SAN)). In some embodiments, storage 105 includes data records (e.g., database rows) that contain any suitable information described herein, such as session data stored by the session recording component 102, predetermined fields analyzed by the field extraction component 104, hashed values/unique identifiers in anticipation that the records will be requested over the computer network(s) 110, and retrieved for hash comparison by the user-computer session stitching component 108, and the like. In some embodiments, each record is called or requested and returned, over the computer network(s) 110, depending on the component needing it, as described herein.

By way of example and not limitation, data included in storage 105, may generally be referred to throughout as data. Any such data, in some embodiments, is sensed or determined from a sensor (referred to herein as sensor data), such as location information of mobile device(s), smartphone data (such as phone state, charging data, date/time, or other information derived from a smartphone), computer user-activity information (for example: app usage; online activity; searches; voice data such as automatic speech recognition; activity logs; communications data including calls, texts, instant messages, and emails; website posts; other records associated with events; or other activity related information) including computer user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor, data derived based on other data (for example, location data that can be derived from Wi-Fi, Cellular network, or IP address data), and nearly any other source of data that may be sensed or determined as described herein.

Figure 2:
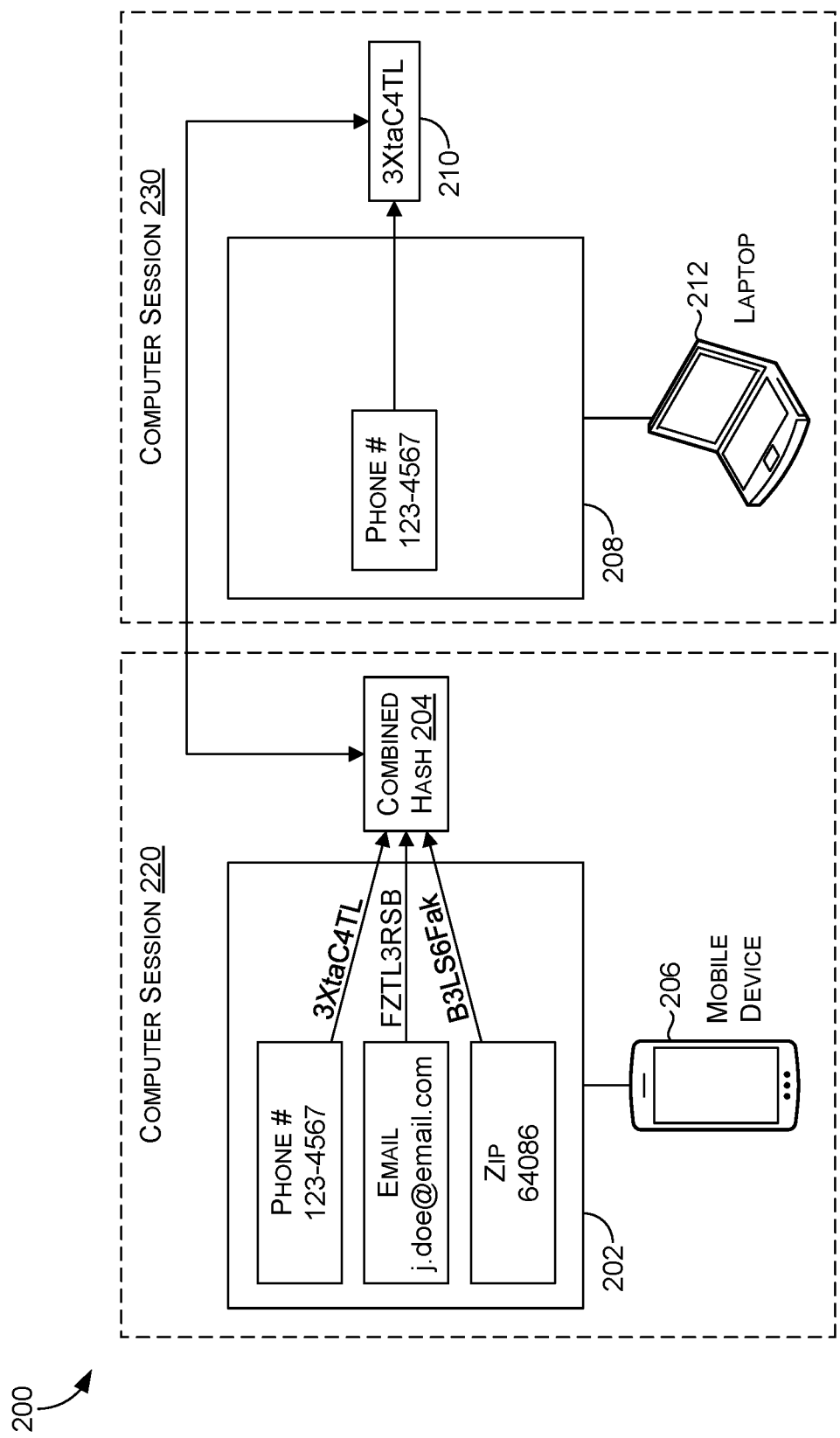
FIG. 2 is a schematic diagram illustrating how hashes are generated for different pages a user has accessed over different computer sessions, according to some embodiments.

FIG. 2 is a schematic diagram illustrating how hashes are generated for different pages a user has accessed over different computer sessions, according to some embodiments. At a first time, a user engages in a first computer session 220. For example, using the mobile device 206, the user logs into a first mobile application (e.g., a banking application) to initiate the first computer session 220. Subsequently, while navigating the web application, the user inputs various values to the page 202; "123-4567" (the user's phone number), "j.doe@email.com" (the user's email address), and "64086" (the user's zip code). In some embodiments, the session recording component 102, as described in FIG. 1, captures such values and field information from page 202, such as "phone number," "email," and "zip," and the particular values the user inputted. Subsequently, in some embodiments, field extraction component 104, as described in FIG. 1, determines which fields (and corresponding values) are the most relevant for hashing and responsively selects such fields, such as the "phone number," "email," and "zip" fields. Responsively, in some embodiments the value anonymization component 106 then hashes each value of each field. As illustrated, the phone number is hashed to "3XtaC4TL," the email address is hashed to "FZTL3RSB," and the zip code is hashed to "B3LS6Fak." In some embodiments, the value anonymization component 106 then combines such hashes into the combined hash 204.

In various embodiments, "combining" hashes includes any suitable functionality, such as adding the hashes together, concatenating the hashes, generating a new hash from the individual hashes, or the like. For instance, an example of adding the hashes is adding the individual hashes of the fields (i.e., "3XtaC4TLFZTL3RSBB3LS6Fak") which combines the phone number hash, the email hash, and then the zip code hash into one large value. In this way, the combined hash becomes more unique every time an individual hash is included in the combined hash 204. In some embodiments, the combined hash 204 is stored to computer storage (e.g., as an individual data record) for later access and comparison with other values hashed, as described below. The user may then close out the first computer session 220 via any suitable action, such as logging out of the first mobile application.

At a second time subsequent to the first time, the same user, using the laptop 212, engages in a second computer session 230 (e.g., via logging into a second application, such as a web application via a web browser). The user navigates to page 208, whereby the session recording component 102, as described in FIG. 1, captures that the user has once again entered their phone number (123-4567). The field extraction component 140 determines that such field is the only relevant field, among other fields, for hashing and the value anonymization component 106 hashes the phone number to hash 210 (i.e., "3XTac4TL").

Responsively, in some embodiments, the user-computer session stitching component 108, as described in FIG. 1, then compares the hash 210 with the combined hash 204. As illustrated in FIG. 2, the phone number hash as extracted from the first session 220 on the page 202 (i.e., 3XTac4TL) is the same as the phone number hash 210 extracted from the second session 230 on the page 208. Accordingly, in some embodiments, regardless of whether or not the rest of the combined hash 204 matches the hash 210, because the combined hash 204 includes the same value as the hash 210, the user-computer session stitching component 108 generates a score indicating that the same user likely accessed both pages 202 and 208 and/or engaged in both computer sessions 220 and 230. This contemplates situations where hosting applications, which can be very different, do not require the user to input the same field values. In this case, one matching hash alone can be associated with a higher probability that the same user accessed both pages or was a part of both computer sessions. In this way, for example, even if just the phone hash is computed for page 208, a probability score is still computed. However, adding a credit card hash, an email address hash, and the like (similar to combined hash 204) makes the hash more unique, thereby increasing the probability that content has been accessed by the same user. The more hashed field values that match, the higher the probability or confidence level that a specific user engaged in a particular computer session. In this way, particular embodiments incrementally generate a score with higher confidence for each hash value detected if one computer session matches another hash value from another computer session.

In some embodiments, the more hashes that match, the higher the probability of the same user accessing both pages will be. For example, if embodiments also detect that the zip code "64086" (i.e., its hash "B3LS6Fak") is also derived from page 208, then there is an even higher probability that the user accessed both pages relative to only the phone number being detected.

Figure 3:
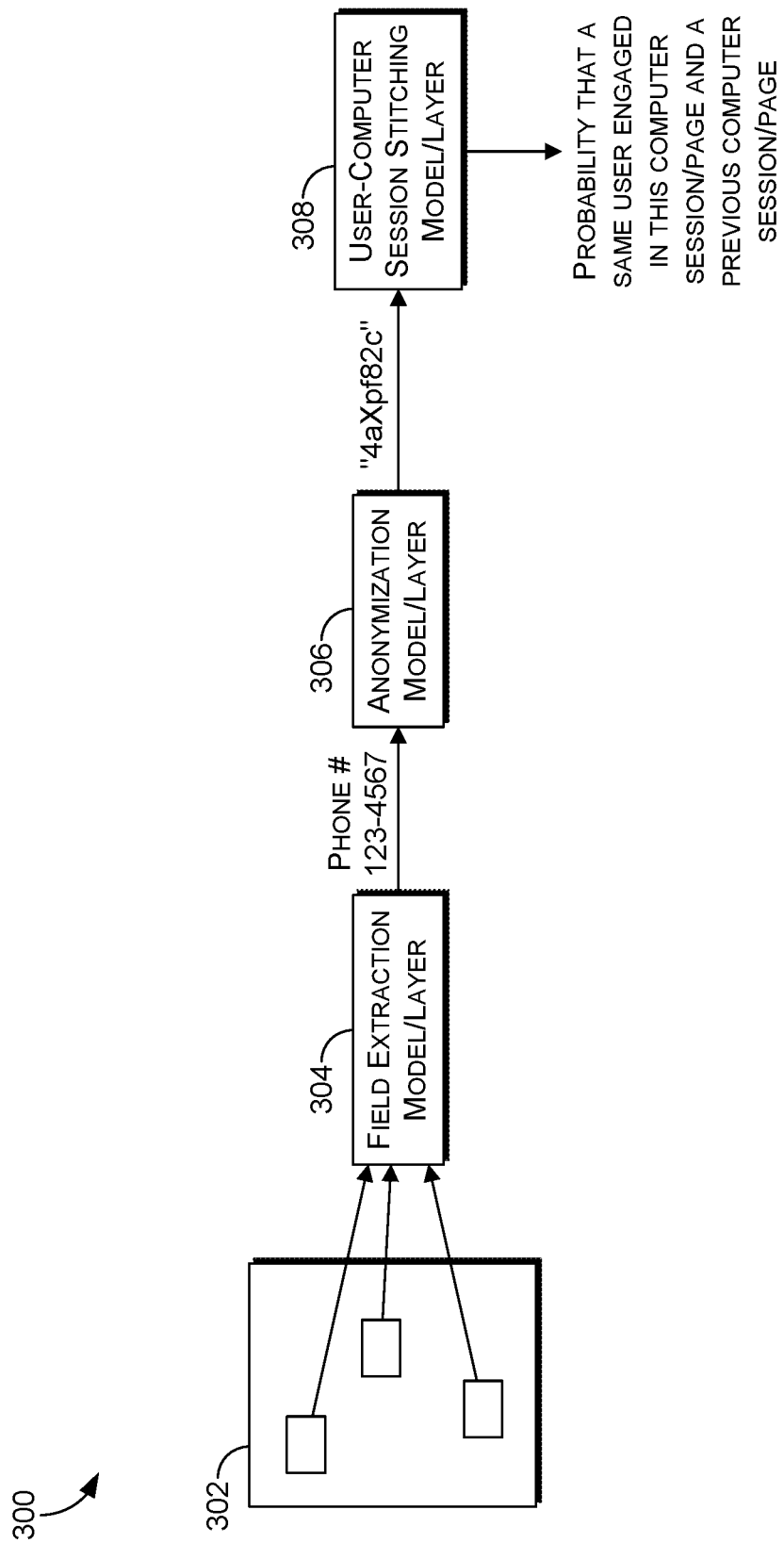
FIG. 3 is a block diagram illustrating example inputs and outputs for generating a probability score that a same user engaged in multiple computer sessions, according to some embodiments.

FIG. 3 is a block diagram illustrating example inputs and outputs for generating a probability score that a same user engaged in multiple computer sessions, according to some embodiments. In some embodiments, the field extraction model/layer 304 includes the functionality as described with respect to the field extraction component 104 of FIG. 1. Likewise, in some embodiments, the anonymization model/layer 306 includes the functionality as described with respect to the value anonymization component 106 of FIG. 1. And in some embodiments, the user-computer session stitching model/layer 308 includes the functionality as described with respect to the user-computer session stitching component 108 of FIG. 1.

At a first time, the field extraction model/layer 304 takes as input, page 302 (e.g., the screenshot 400 of FIG. 4) and extracts from page 302 a particular value (i.e., the phone number 123-4567). At a second time, the anonymization model/layer 306 takes as input, the phone number 123-4567 and anonymizes the phone number to "4aXpf82c." At a third time, the user-computer session stitching model/layer 308 takes, as input, the hash "4aXpf82c" and compares it to one or more anonymized values of other field values of previous computer sessions or information entered on previous pages. Based at least in part on such comparison, the user-computer session stitching model/layer 308 generates a score, which is an X (e.g., 96) probability that a same user engaged in this computer session (and/or on this page) and a previous computer session (and/or on a different page). For example, the same hash may have been generated for a prior session, indicating that the same phone number was inputted, thereby triggering the probability score being higher that the same user accessed both pages. Additional or alternative functionality can occur for generating the scores, such as detecting a same IP address of devices for each of the computer sessions, a comparison between other field values, and the like, as described in more detail below.

FIG. 4 is a screenshot 400 of an example page illustrating particular field values that can be hashed, according to some embodiments. As illustrated in the screenshot 400, the page includes multiple fields and values. For example, the "Membership Number" field includes value 408 (i.e., 123123123123). In some embodiments, the field extraction component 104 of FIG. 1 generates a score indicating that the "payment method" field, the "shipping address" field, and the "billing address" field (and/or its corresponding values) corresponds to (e.g., is a constituent of or matches) one or more predetermined fields. A "predetermined" field is any suitable field learned, via training, by one or more machine learning models (which is described in more detail below) and/or fields indicated, at program development time, that are to be searched for or selected in each page a user navigates to. Such searched fields are indicative of the fields particular embodiments anonymize for comparison, as described herein. In this way, as illustrated in FIG. 4, some fields are extracted and anonymized, such as 402, 404, and 406, while others are disregarded, such as field 408.

In some embodiments, determining whether a field "corresponds" to (e.g., matches) the predetermined field includes determining whether the field matches the exact same syntax (e.g., letter-by-letter) as the keyword itself (e.g., via term frequency-inverse document frequency (TF-IDF)). For example, a processor executing the field extraction component 104 (FIG. 1) takes, as input, the word "email address" (i.e., the predetermined field) and finds this exact phrase in the document 400, which is a match. Alternatively or additionally, in some embodiments, determining whether a field corresponds to the predetermined field includes determining whether one or more words within the page 400 has the same semantic meaning as a predetermined field, even though there may be differing syntax (e.g., different letters and/or added/subtracted words). For example, a predetermined field may be "phone number," but no such string with the exact syntactic match is found in the page 400, but a similar phrase can be found in the page, such as "telephone number." In these embodiments, both "phone number" and "telephone number" are semantically similar.

As illustrated in the screenshot 400, particular embodiments anonymize the field value 402 (i.e., the credit card number) to "v66si6t," anonymize the field value 404 (i.e., the phone number) to be "gkdnf53x," and anonymize the field value 406 (i.e., the zip code) to "v9a9cw." As described above, in some embodiments, the user-computer session stitching component 108 (FIG. 1) combines these hashes or uses any one of these hashes to generate the score that indicates whether a same user was part of multiple computer sessions. In some embodiments, the user-computer session stitching component 108 does not hash each individual field value as illustrated in the screenshot 400, but rather, for example, it first combines each of the values 402, 404, and 406 (in their natural language or numerical form) and then makes a single hash of all the values. Alternatively or additionally, some embodiments convert or encode each of the values 402, 404, and 406 into a feature vector and then concatenate the feature vectors for downstream analysis by a machine learning model, as described in more detail below.

Figure 5:
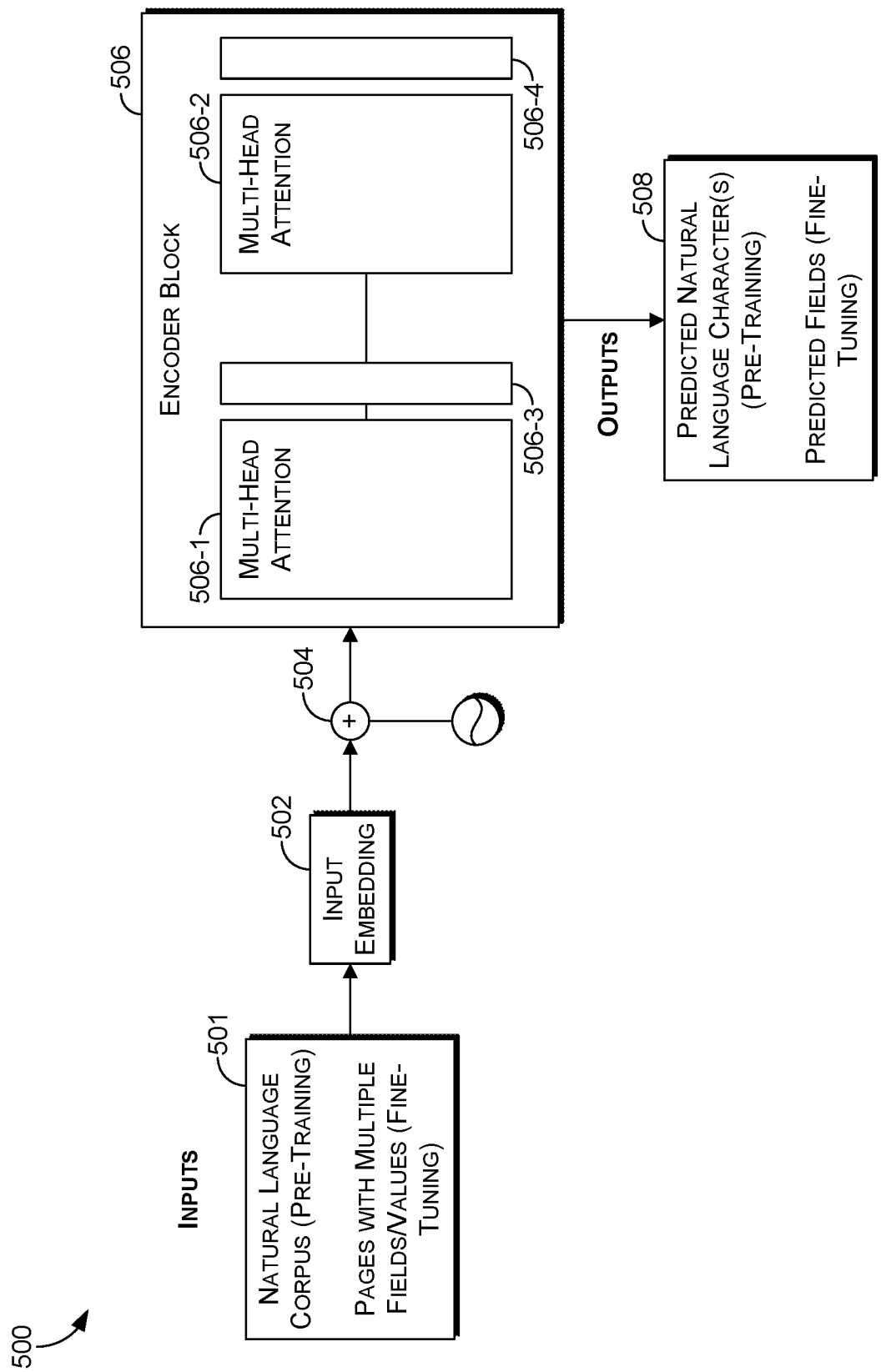
FIG. 5 is a block diagram of a modified BERT model or encoder that uses particular inputs to predict certain natural language characters and detect a particular field that a page contains, according to some embodiments.

FIG. 5 is a block diagram of a modified BERT model or encoder that uses particular inputs to predict certain natural language characters and detect a particular field that a page contains, according to some embodiments. In some embodiments, this model represents or includes the functionality as described with respect to the field extraction component 104 of FIG. 1 and/or the field extraction model/layer 304 of FIG. 3.

First, a natural language corpus (e.g., various WikipediaWIKIPEDIA English words or BooksCorpus) of the inputs 501 are converted into feature vectors and embedded into an input embedding 402 (FIG. 4) to derive meaning of individual natural language words (for example, English semantics) during pre-training. In some embodiments, to understand English language, corpus documents, such as text books, periodicals, blogs, social media feeds, and the like are ingested by the model.

In some embodiments, each word or character in the input(s) 501 is mapped into the input embedding 502 in parallel or at the same time, unlike existing long short-term memory (LSTM) models, for example. The input embedding 502 maps a word to a feature vector representing the word. But the same word (for example, "apple") in different sentences may have different meanings (for example, phone v. fruit). This is why a positional encoder 504 can be implemented. A positional encoder 504 is a vector that gives context to words (for example, "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$PE_{(pos,2i)} = \sin(pos/10000^{2i/d_{model}})$$

$$PE_{(pos,2i+1)} = \cos(pos/10000^{2i/d_{model}})$$

After passing the input(s) 501 through the input embedding 502 and applying the positional encoder 504, the output is a word embedding feature vector, which encodes positional information or context based on the positional encoder 504. These word embedding feature vectors are then passed to the encoder block 506, where it goes through a multi-head attention layer 506-1 and a feedforward layer 506-2. The multi-head attention layer 506-1 is generally responsible for focusing or processing certain parts of the feature vectors representing specific portions of the input(s) 501 by generating attention vectors. For example, in Question Answering systems, the multi-head attention layer 506-1 determines how relevant the $i^{th}$ word (or particular word in a block) is for answering the question or relevant to other words in the same or other blocks, the output of which is an attention vector. For every word, some embodiments generate an attention vector, which captures contextual relationships between other words in the same sentence, block, and or line. For a given word, some embodiments compute a weighted average or otherwise aggregate attention vectors of other words that contain the given word (for example, other words in the same line or block) to compute a final attention vector.

In some embodiments, a single headed attention has abstract vectors Q, K, and V that extract different components of a particular word. These are used to compute the attention vectors for every word, using the following formula:

$$Z = \text{softmax}\left(\frac{Q \cdot K^T}{\sqrt{\text{Dimension of vector } Q, K \text{ or } V}}\right) \cdot V$$

For multi-headed attention, there a multiple weight matrices $W^q$, $W^k$ and $W^v$ so there are multiple attention vectors Z for every word. However, a neural network may only expect one attention vector per word. Accordingly, another weighted matrix, $W^z$, is used to make sure the output is still an attention vector per word. In some embodiments, after the layers 506-1 and 506-2, there is some form of normalization (for example, batch normalization and/or layer normalization) performed to smoothen out the loss surface making it easier to optimize while using larger learning rates.

Layers 506-3 and 506-4 represent residual connection and/or normalization layers where normalization re-centers and re-scales or normalizes the data across the feature dimensions. The feedforward layer 506-2 is a feed forward neural network that is applied to every one of the attention vectors outputted by the multi-head attention layer 506-1. The feedforward layer 506-2 transforms the attention vectors into a form that can be processed by the next encoder block or making a prediction at 508. For example, given that a user has currently (or historically) typed a first natural language sequence "the due date is . . . " the encoder block 506 predicts that the next natural language sequence (or field type) will be a specific date or particular words based on past documents that include language identical or similar to the first natural language sequence.

In some embodiments, the encoder block 506 includes pre-training and fine-tuning to learn language (pre-training) and make the field detections (predictions) at 508 (fine-tuning). In some embodiments, pre-training is performed to understand language and fine-tuning is performed to learn a specific task, such as learning an answer to a set of questions (in Question Answering systems) and/or learn particular field types of a given page for detecting fields, as described herein.

In some embodiments, the encoder block 506 learns what language and context for a word is in pre-training by training on two unsupervised tasks (MLM and NSP) simultaneously or at the same time. In terms of the inputs and outputs, at pre-training, the natural language corpus of the inputs 501 may be various historical documents, such as text books, journals, periodicals in order to output the predicted natural language characters in 508 (not detect fields at this point). The encoder block 506 takes in a sentence, paragraph, or line (for example, included in the input(s) 501), with random words being replaced with masks. The goal is to output the value or meaning of the masked tokens. For example, if a line reads, "please [MASK] this document promptly," the prediction for the "mask" value is "send." This helps the encoder block 506 understand the bidirectional context in a sentence, paragraph, or line at a document. In the case of NSP, the encoder 506 takes, as input, two or more elements, such as sentences, lines, or paragraphs and determines, for example, if a second line in a document actually follows (for example, is directly below) a first line in the document. This helps the encoder block 506 understand the context across all the elements of a document, not just within a single element. Using both of these together, the encoder block 506 derives a good understanding of natural language.

In some embodiments, during pre-training, the input to the encoder block 506 is a set (for example, 2) of masked sentences (sentences for which there are one or more masks), which could alternatively be partial strings or paragraphs. In some embodiments, each word is represented as a token, and some of the tokens, are masked. Each token is then converted into a word embedding (for example, 502). At the output side is the binary output for the next sentence prediction. For example, this component may output 1, for example, if masked line 2 followed (for example, was directly beneath) masked block 1. The output is word feature vectors that correspond to the outputs for the machine learning model functionality. Thus, the number of word feature vectors that are input is the same number of word feature vectors that are output.

In some embodiments, the initial embedding (for example, the input embedding 502) is constructed from three vectors: the token embeddings, the segment or context-question embeddings, and the position embeddings. In some embodiments, the following functionality occurs in the pre-training phase. The token embeddings are the pre-trained embeddings. The segment embeddings are the sentence number (that includes the input(s) 501) that is encoded into a vector (for example, first sentence, second sentence, etc. assuming a top-down and right-to-left approach). The position embeddings are vectors that represent the position of a particular word in such sentence that can be produced by positional encoder 504. When these three embeddings are added or concatenated together, an embedding vector is generated that is used as input into the encoder block 506. The segment and position embeddings are used for temporal ordering since all of the vectors are fed into the encoder block 506 simultaneously and language models need some sort of order preserved.

In pre-training, the output is typically a binary value C (for NSP) and various word vectors (for MLM). With training, a loss (for example, cross entropy loss) is minimized. In some embodiments, all the feature vectors are of the same size and are generated simultaneously. As such, each word vector can be passed to a fully connected layered output with the same number of neurons equal to the same number of tokens in the vocabulary.

Some embodiments are additionally responsible for fine-tuning the encoder block 506 after it has been pre-trained. In terms of the inputs and output, the input(s) 501 now include different pages (e.g., web or app pages, such as the screenshot 400), each of which contain multiple fields and/or values, and the output 508 now includes the predicted field type (the detected fields) located in the corresponding pages. Once pre-training is performed, the encoder block 506 is trained on very specific tasks, such as Question Answering, modified NSP or MLM, detecting which fields are contained in pages, and the like. In Question Answering tasks, models receive a question regarding text content (for example, "given the page X, does it include a "phone number" field?") and mark or tag the beginning and end of the answer in the page (for example, the phone number "123, 4567") in a document. For example, in Question Answering, some embodiments replace the fully connected output layers of the encoder block 506 used in pre-training, with a fresh set of output layers that can output the answer to a given question. Subsequently, supervised training can be performed using a Question Answering dataset.

Accordingly certain embodiments change the model for fine-tuning by changing the input layer and the output layer. That is, for example, the inputs are changed from the masked sentence 1 and 2 tokens to a "question" and "sentence" that contains an answer (or candidate answer) as the tokens. In the output layer, certain embodiments output the start and end words (or characters) that encapsulates the answer (the field). In some embodiments, such question-answer pairs are specifically labeled as completed or not completed (for example, answered or not answered).

In an illustrative example of fine-tuning or making inferences with the encoder block 506, some embodiments learn that given multiple pages of field values that contain phone numbers (the fine-tuning) in the inputs 501, the most likely field (or field type) that a value is a constituent of is likely X. For example, the model predicts that the value "123-4567" is likely a phone number or is a constituent of a phone number field given the training on QA pairs. In this way, a language model can be trained and fine-tuned not only to understand natural language but predict what fields or categories a particular value belongs to/is a constituent of.

It is understood that a different model/training process is alternatively or additionally used compared to Question Anwering systems or the model in FIG. 5. For example, in some embodiments, an annotator (either programmatic or human) is used to label different fields within the fine-tuning dataset of pages and the predictions 508 are based on learning weights associated with different features of the labeled fields. For example, annotators label each web or app page with a "phone number" field (which captures different phone numbers), a "credit card" field (which captures different credit card numbers) and the like. In this way, the model learns weights or features that are indicative of the particular annotated field. For example, for multiple pages with multiple annotated phone number fields, the model learns that these phone number fields always contain 3 numbers, followed by a dash, followed by 4 additional numbers. Accordingly, any input that conforms to this learned pattern, the generated score is more indicative that the particular field value is a constituent of a "phone number" field, whereas inputs that contain natural language letters and do not follow one or more of these patterns are more indicative of another field (or not indicative of a phone number).

Some embodiments additionally or alternatively analyze the payload of the field itself to generate scores for detecting the field/field type. For example, in some embodiments, particular embodiments use term frequency-inverse document frequency (TF-IDF) algorithms. TF-IDF algorithms include numerical statistics that infer how important a query word or term is to a data set (e.g., a page). "Term frequency" illustrates how frequently a term of a query (e.g., a predetermined field) occurs within a data set, which is then divided by the data set length (i.e., the total quantity of terms in the data set). "Inverse document frequency" infers how important a term is by reducing the weights of frequently used or generic terms, such as "the" and "of," which may have a high count in a data set but have little importance for relevancy of a query. In these embodiments, for example, where a predetermined field is "credit card," these algorithms can use term frequency to find the exact string match (i.e., "credit card") in a page and remove all other words in the page via inverse document frequency and responsively detect there is a "credit card" field on the page based on the exact match found in the page.

Some embodiments alternatively or additionally use natural language processing (NLP) in order to find semantically similar words. For example, a predetermined field (a field that embodiments search for in a document) may be "email address" and a page may only contain the field "email." Particular embodiments can determine that these are the same fields (or that the "email" field is an "email address" field because they are semantically similar). For instance, some embodiments first tokenize fields on pages into their constituent words, numbers, symbols, and some or each of the words are tagged with a part-of-speech (POS) identifier. "Tokenization" or parsing in various embodiments corresponds to a computer-implemented process that segments the content into words, sentences, symbols, character sequence, and/or other elements of the content. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, each word of a page is tagged with identifiers, such POS identifiers.

In some embodiments, NLP derives semantic and syntactic content of semi-structured or unstructured data (e.g., data in image files). This is in contrast to analyzing "structured" data, such as data in a database. NLP can be configured to parse content to determine semantic context (e.g., the meaning of words by analyzing each word in a document against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments, NLP includes Named Entity Recognition (NER). NER is an information extraction technique that identifies and classifies elements or "entities" in natural language text into predefined categories. Such predefined categories may be indicated in corresponding tags or labels. Entities can be, for example, names of people, specific organizations, specific locations, specific times, specific quantities, specific monetary price values, specific percentages, specific pages, and the like. Likewise, the corresponding tags or labels can be specific people, organizations, location, time, price (or other invoice data) and the like. In this context of the present disclosure, for example, these tags or labels can indicate whether certain extracted attributes correspond to a "credit card" field of a page, the name of an entity (e.g., a particular corporation), line item information (e.g., description of service or item billed), address of an entity, or the particular date listed on the page.

In some embodiments, the field extraction component 104 (FIG. 1) uses distance between both the field name (e.g., "phone number") and corresponding values (e.g., "123-4567") to detect a particular field. For example, some embodiments determine, at the page, a location of each value relative to the field name. For example, some embodiments determine a direction and distance (e.g., cosine distance) that the field name "total amount" is from a value that reads "$200.00." Based on such location and a first rule, some embodiments generate a first score for each value, where the first score is at least partially indicative of whether each respective values is within a threshold position relative to the one or more keywords. For example, the highest score may be given to the "$200.00" value (and not a "5" value) because it is directly to the left of and at the same height as the "total amount" field name, as opposed to being outside of a distance threshold and not aligned.

Figure 6:
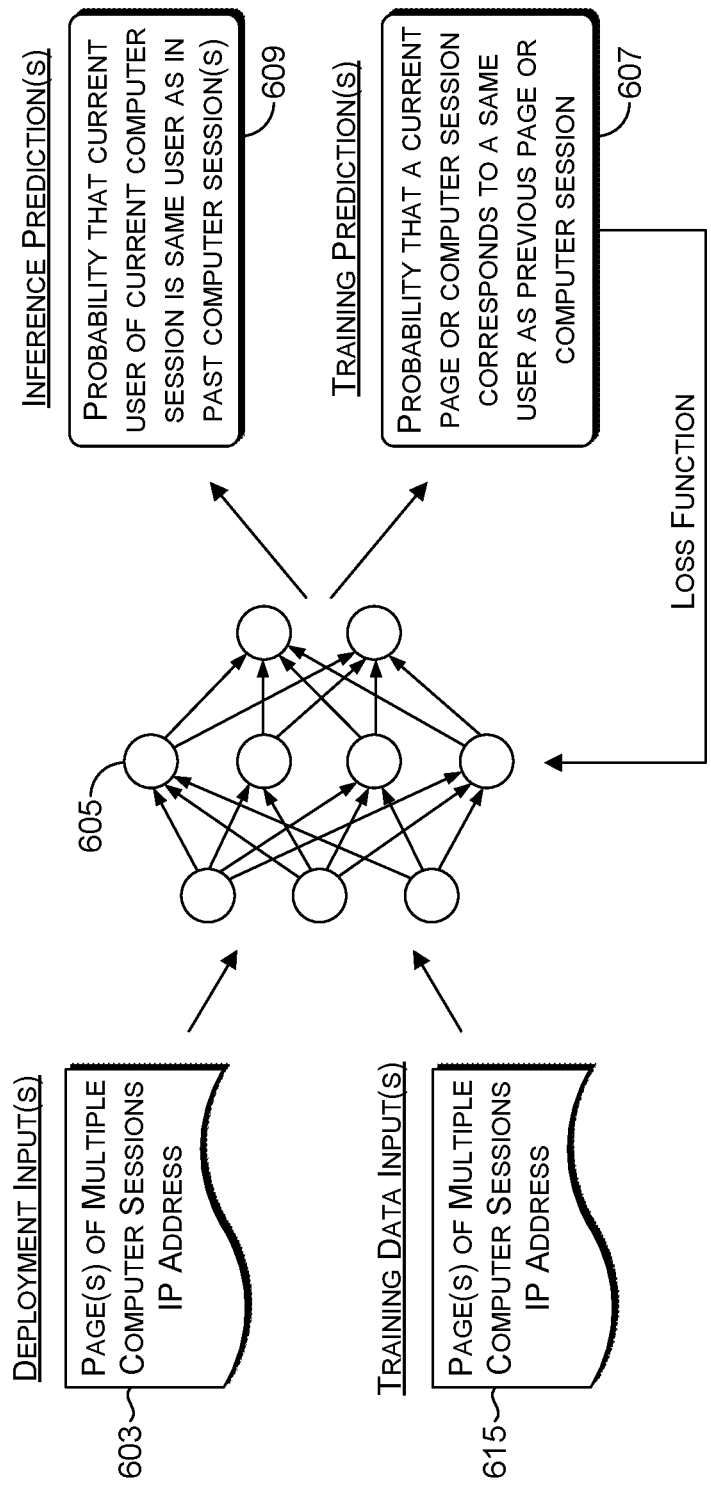
FIG. 6 is a schematic diagram illustrating how a neural network makes particular training and deployment predictions given specific inputs, according to some embodiments.

FIG. 6 is a schematic diagram illustrating how a neural network 605 makes particular training and deployment predictions given specific inputs, according to some embodiments. In one or more embodiments, the neural network 605 represents or includes at least some of the functionality as described with respect to the user-computer session stitching component 108 of FIG. 1 and/or the user-user-computer session stitching model/layer 308 of FIG. 3. In some embodiments, the neural network 605 represents or includes alternative or additional model functionality, such as supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

In various embodiments, the neural network 605 is trained using one or more data sets of the training data input(s) 615 in order to make acceptable loss training prediction(s) 607, which will help later at deployment time to make correct inference prediction(s) 609. In one or more embodiments, learning or training includes minimizing a loss function between the target variable (for example, an incorrect prediction that a user is a part of two sessions) and the actual predicted variable (for example, a correct prediction that a user is a part of multiple sessions). Based on the loss determined by a loss function (for example, Mean Squared Error Loss (MSEL), cross-entropy loss, etc.), the loss function learns to reduce the error in prediction over multiple epochs or training sessions so that the neural network 605 learns which features and weights are indicative of the correct inferences, given the inputs. Accordingly, it is desirable to arrive as close to 100% confidence in a particular classification or inference as close as possible so as to reduce the prediction error. In an illustrative example, the neural network 605 learns over several epochs that for a given session or page sequence (which simulates pages a user navigates during a session), the most likely user is X. It is understood that in some embodiments, the page(s) of multiple computer sessions in the deployment inputs 603 and the training data input(s) represent anonymized values (e.g., as anonymized by the anonymization model/layer 306 of FIG. 3).

Subsequent to a first round/epoch of training (for example, processing the "training data input(s)" 615, the neural network 605 makes predictions, which may or may not be at acceptable loss function levels. For example, the neural network 605 may process the training data input(s) 615. Subsequently, the neural network 605 may predict that a user accessed content from other computer sessions. This process may then be repeated over multiple iterations or epochs until the optimal or correct predicted value(s) is learned (for example, by maximizing rewards and minimizing losses) and/or the loss function reduces the error in prediction to acceptable levels of confidence.

In one or more embodiments, the neural network 605 converts or encodes the runtime deployment input(s) 603 and training data input(s) 615 into corresponding feature vectors in feature space (for example, via a convolutional layer(s)). A "feature vector" (also referred to as a "vector") as described herein may include one or more real numbers, such as a series of floating values or integers (for example, [0, 1, 0, 0]) that represent one or more other real numbers, a natural language (for example, English) word and/or other character sequence (for example, a symbol (for example, @, !, #), a phrase, and/or sentence, etc.). Such natural language words and/or character sequences correspond to the set of features and are encoded or converted into corresponding feature vectors so that computers can process the corresponding extracted features. For example, embodiments can parse, tokenize, and encode each value or other content in pages into one or more feature vectors.

In some embodiments, the neural network 605 learns, via training, parameters, or weights so that similar features are closer (for example, via Euclidian or cosine distance) to each other in feature space by minimizing a loss via a loss function (for example, Triplet loss or GE2E loss). Such training occurs based on one or more of the training data input(s) 615, which are fed to the neural network 605.

One or more embodiments determine one or more feature vectors representing the input(s) 615 in vector space by aggregating (for example, mean/median or dot product) the feature vector values to arrive at a particular point in feature space. For example, certain embodiments formulate a dot product of the pages for a single session (representing all pages navigated during the session) and/or formulate a dot product of the field values for a single page (e.g., all the values at the screenshot 400 of FIG. 4), and then aggregates these values into a single feature vector.

In one or more embodiments, the neural network 605 learns features from the training data input(s) 615 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores.

In another illustrative example of training, one or more embodiments learn an embedding of feature vectors based on learning (for example, deep learning) to detect similar features between training data input(s) 615 in feature space using distance measures, such as cosine (or Euclidian) distance. For example, the training data input 615 is converted from string or other form into a vector (for example, a set of real numbers) where each value or set of values represents the individual features (for example, individual field values and/or individual pages of multiple sessions) in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, for a first field value (e.g., a phone number) of multiple sessions in the training data input(s) 615 created by a user at, the neural network 605 can learn that the same phone number inputted over multiple sessions means that the same user has accessed page(s) in these different sessions over 90% of the time. Consequently, this pattern can be weighted (for example, a node connection is strengthened to a value close to 1), whereas other node connections (for example, representing other non-important fields (like date) are weakened to a value closer to 0). In this way, embodiments learn weights corresponding to different features such that similar features found in inputs contribute positively for predictions.

In some embodiments, such training is supervised using annotations or labels. Alternatively or additionally, in some embodiments, such training is not-supervised using annotations or labels but can, for example, include clustering different unknown clusters of data points together. For example, in some embodiments, training includes (or is preceded by) annotating/labeling each page (and thus fields and values) with particular unique identifiers (representing specific users) so that the neural network 605 learns the fields and values the same user inputs, which is used to change the weights/neural node connections for future predictions. For example, the neural network 605 may learn that multiple users tend to use different email addresses across computer sessions or page navigation. As such, the neural network 605 accordingly adjusts the weights or deactivates nodes such that email address is not as strong of a signal to use for training predictions at 607.

In one or more embodiments, subsequent to the neural network 605 training, the neural network 605 (for example, in a deployed state) receives one or more of the deployment input(s) 603. When a machine learning model is deployed, it has typically been trained, tested, and packaged so that it can process data it has never processed. Responsively, in one or more embodiments, the deployment input(s) 603 are automatically converted to one or more feature vectors and mapped in the same feature space as vector(s) representing the training data input(s) 615 and/or training predictions(s) 607. Responsively, one or more embodiments determine a distance (for example, a Euclidian distance) between the one or more feature vectors and other vectors representing the training data input(s) 615 or predictions, which is used to generate one or more of the inference prediction(s) 609.

In an illustrative example, the neural network 605 receives an indication that a user (whose identity is not known) has accessed a first web or app page of a first computer application at a first computer session. The neural network 605 then determines a distance (for example, a Euclidian distance) between the vector representing the runtime deployment input(s) 603 and the training data input(s) 615. Based on the distance being within a threshold distance, particular embodiments generate a score at inference prediction(s) 609, which indicates a probability that the current user of the current computer session is the same user as in past computer session(s).

In certain embodiments, the inference prediction(s) 609 may either be hard (for example, membership of a class is a binary "yes" or "no") or soft (for example, there is a probability or likelihood attached to the labels). Alternatively or additionally, transfer learning may occur. Transfer learning is the concept of re-utilizing a pre-trained model for a new related problem (for example, a new video encoder, new feedback, etc.).

Figure 7:
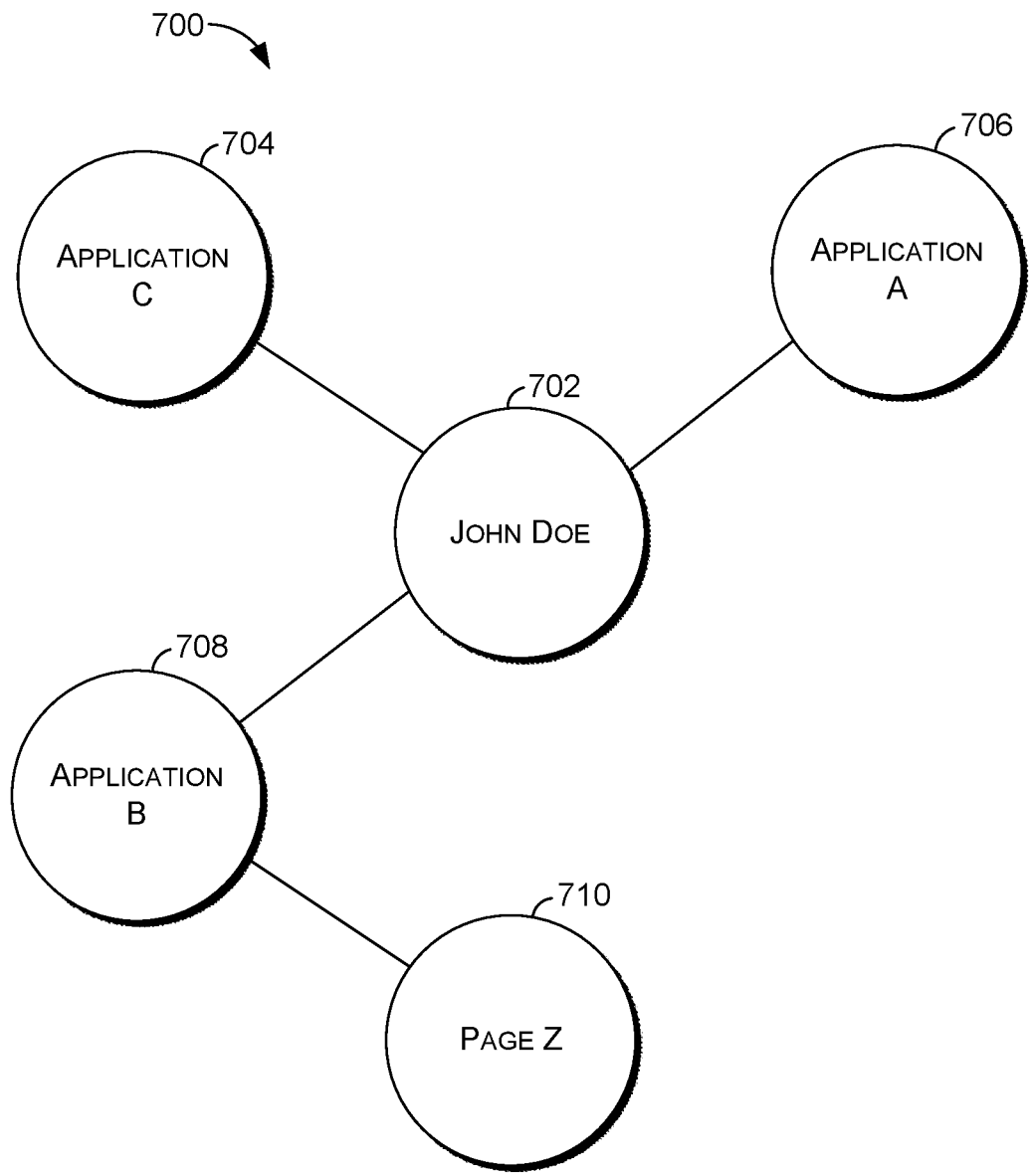
FIG. 7 is a schematic diagram of an example network graph, according to some embodiments.

FIG. 7 is a schematic diagram of an example network graph 700, according to some embodiments. In some embodiments, the network graph 700 is a structure used by the user-computer session stitching component 108 of FIG. 1, the user-computer stitching model/layer 308 of FIG. 3, or is included in the deployment inputs 603 of FIG. 6 to access historical computer user activity and/or page content for generating scores. A network graph is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, the network graph 700 (an undirected graph) includes the nodes or vertices of: 702 (representing John Doe), 704 (representing application C), 706 (representing application A), 708 (representing application B), and node 710 (representing page Z of application B).

The network graph 700 specifically shows the relationships between a user, John Doe (or a unique identifier representing John Doe, so as to preserve privacy), and various applications and stores (or points to) computer user activity of John Doe for each application or page. In this way, for example, the user-computer session stitching component 108 (FIG. 1) "walks" the network graph 700 to detect all the pages of all the applications a particular user has interacted with in order to compare the historical hashed values (e.g., phone numbers) with a current hashed value (e.g., a near real-time phone number entered by a user). This contemplates situations where users may input particular values at different times, meaning that no single given session may provide particular field values necessary for anonymized value comparison. Rather, a history of computer sessions may reveal particular field values necessary for comparison. For example, a user may input a particular phone number at registration time during a first computer session for application A. However, during the next several computer sessions, the user may not input the phone number again. Particular embodiments still capture the entire history that a user interacts with the application.

Alternative or in addition to the network graph 700, some embodiments use other computer session tracking functionality, such as computer user activity logs (e.g., browser logs or application logs), which provide a time-stamped indication of the precise computer user activity a user has performed. Some embodiments build the network graph 700 in response to the user-computer session stitching component 108 (FIG. 1) generating a particular score. For example, based on determining that John Doe accessed both application A and application C in different sessions (via hash comparisons), particular embodiments generate the nodes 706 and 704, which link to the node 702, which represents all the hashed values (particular field values) that are common between the two applications. In other words, instead of the node 702 being named "John Doe," the node 702 is named by the common hash values (e.g., hashed phone numbers) between application A and C, which indicates that the same user entered the same phone number between the two different sessions when interacting with applications A and C.

Figure 8:
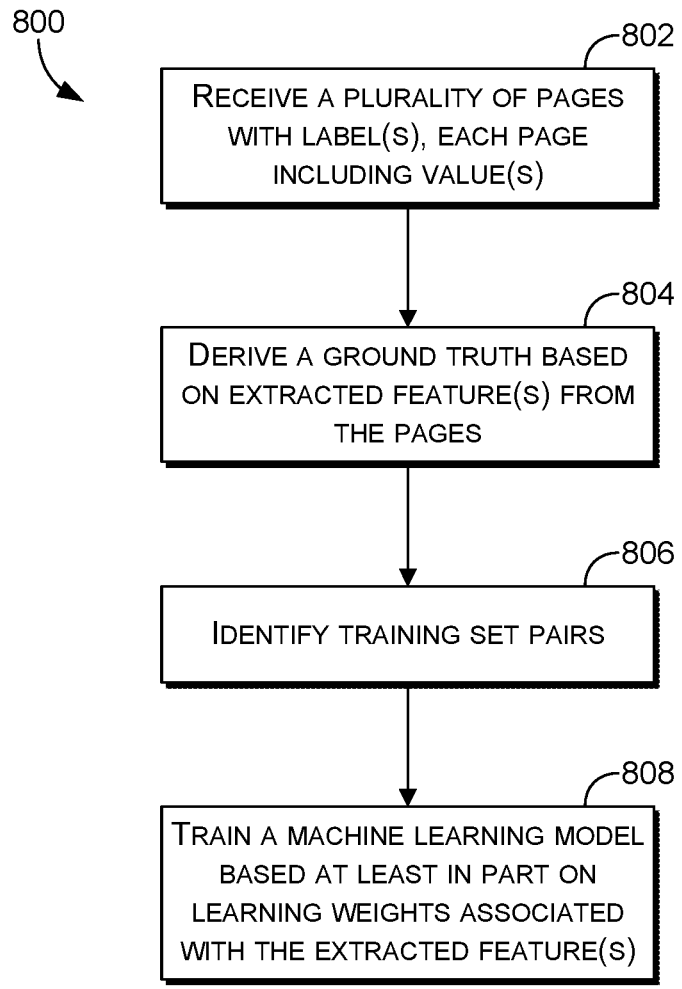
FIG. 8 is a flow diagram of an example process for training a machine learning model on various pages, according to some embodiments.

FIG. 8 is a flow diagram of an example process 800 for training a machine learning model on various pages, according to some embodiments. The process 800 (and/or any of the functionality described herein) may be performed by processing logic that comprises hardware (for example, circuitry, dedicated logic, programmable logic, microcode, and the like), software (for example, instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (for example, as described with respect to FIGS. 1-7). The computer-implemented method, the system (that includes at least one computing device having at least one processor and at least one computer readable storage medium), and/or the computer readable medium as described herein may perform or be caused to perform the process 800 or any other functionality described herein.

In some embodiments, the process 800 is performed by the modified BERT model of FIG. 5 to learn different fields or the neural network 605 of FIG. 6 to learn which fields, values, and/or other signals are indicative that a same user accessed content from different computer sessions. Per block 802, a plurality of pages with one or more label(s) are received, where each page includes one or more values (e.g., of particular fields), which may be anonymized or not anonymized. For example, a page identical to the screenshot 400 of FIG. 4 is received, with visual annotations (labels) indicating that the value 402 is a "credit card number," the value 404 is a "phone number" and the value 406 is a "zip code," in preparation to learn particular fields. In another example, the screenshot 400 is alternatively or additionally labeled as "user X," which is indicative that the user X inputted all the information at the screenshot 400. In some embodiments, such labeling is performed for multiple pages across multiple sessions for predicting whether particular values of different pages or computer sessions were inputted by the same user. In yet another example, the screenshot 400 is alternatively or additionally labeled with the particular computer session ID so as to distinguish different sessions engaged in by a user.

Per block 804, a ground truth is derived based on one or more extracted features from the pages. For example, each field value of each page and computer session (e.g., phone numbers, credit card numbers, zip codes, etc.) is encoded into a feature vector and embedded in feature space to represent the ground truth.

Per block 806, training set pairs are identified. In some embodiments, such training set pairs are entirely different pages than the plurality of pages received at block 802, which were used to derive the ground truth. In an illustrative example of block 806, two training set pairs of the same type are paired, such as two pages that a same user interacted with during different sessions. In another example, two training set pairs of different types are paired, such as two pages that different users interacted with during different sessions.

Per block 808, a machine learning model is trained based at least in part on learning weights associated with the extracted features. In other words, various embodiments learn an embedding of the training set pairs in light of the ground truth. For instance, some embodiments determine a distance between a ground truth feature vector representing a labeled page and a feature vector representing one of the training set pairs. Based on the loss (e.g., the difference in distance between the ground truth and a training set pair) determined by a loss function (e.g., Mean Squared Error Loss (MSEL), cross-entropy loss), the loss function learns to reduce the error in prediction over multiple epochs or training sessions. For example, some embodiments train a neural network with the mean square error loss:

$$l = \frac{1}{n}\sum_{i}^{n} \|\grave{u}_i(t+1) - \grave{u}'_i(t+1)\|_2^2,$$

where $\grave{u}'_i(t+1)$ is the ground truth. Some embodiments adopt the Adam optimizer for training, with a learning rate starting from 0.0001 along with a decay factor of 0.96 at each epoch. In an illustrative example of block 808, some embodiments learn for dozens of pages labeled as "user A," the user's email address changed considerably but the phone number was identical across each page. Accordingly, over many epochs, the model learns and weights higher, the phone number and weights lower, the email address, such that a same phone number detected across multiple pages corresponds to a higher probability that the user accessed content across multiple computer sessions and an unaffected probability that the user accessed content across multiple computer sessions even if the email address changed.

Figure 9:
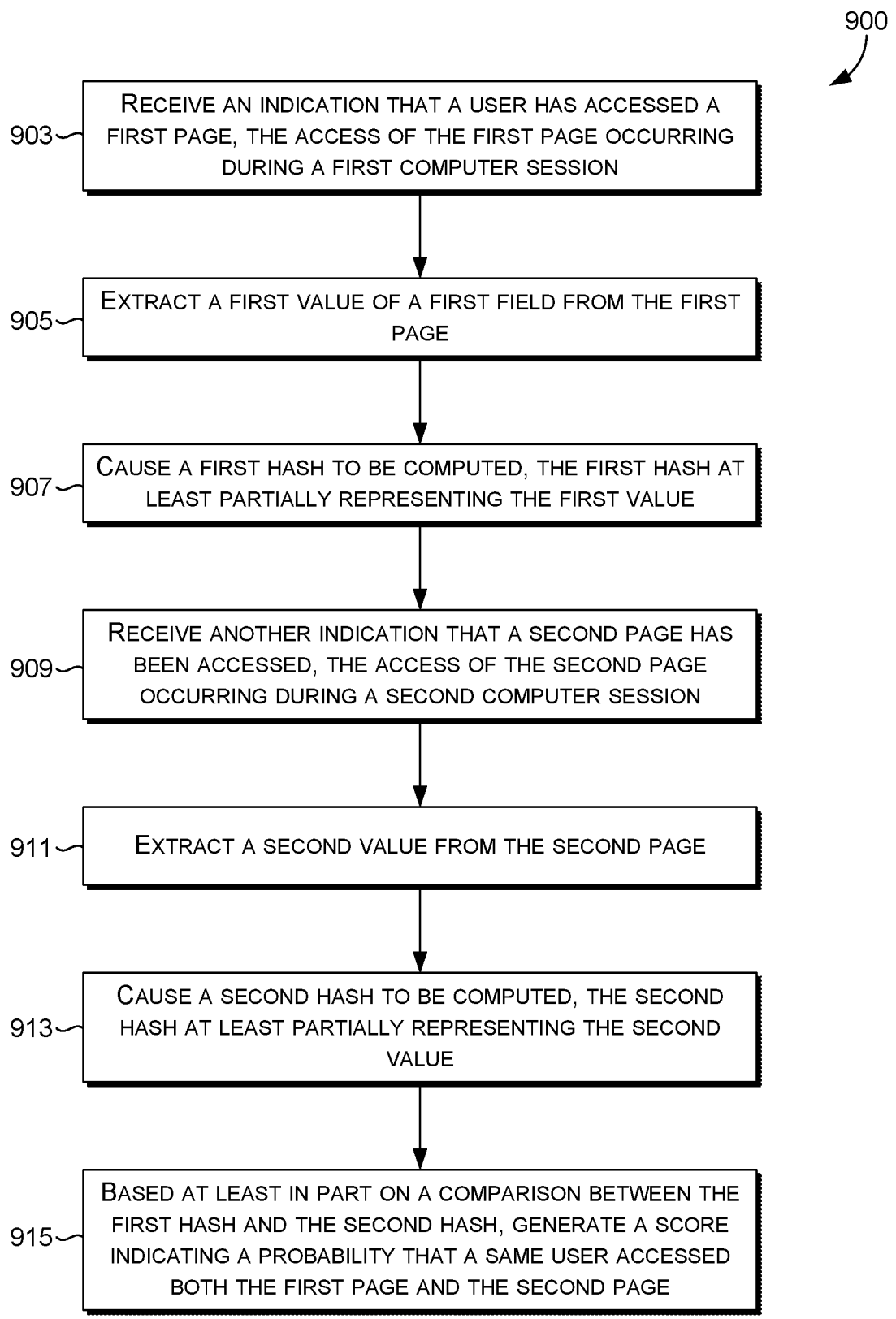
FIG. 9 is a flow diagram of an example process for generating a score indicating a probability that a same user accessed a first page and a second page or accessed content from different computer sessions, according to some embodiments.

FIG. 9 is a flow diagram of an example process 900 for generating a score indicating a probability that a same user accessed a first page and a second page or accessed content from different computer sessions, according to some embodiments. In some embodiments, the process 900 occurs at runtime or model deployment time such that the process 800 (FIG. 8) for training a machine learning model has already occurred.

Per block 903, particular embodiments receive an indication (e.g., a flag, a Boolean, or other value) that a user has accessed (via a first user device associated with the user) a first page, where the access of the first page occurs during a first computer session. An "access" of a page, as described herein includes any suitable computer user activity, such as a user logging into (e.g., via URL input) a particular site, or the user making a particular selection, or the like once a page has been rendered to the user. In some embodiments, the first page is a "web page" of a web application. In other embodiments, the first page is an "app page" of a mobile or other application.

A "computer session" as described herein is initiated and terminates in any suitable manner. For example, in some embodiments, a computer session is initiated when a user logs into a site, or is recognized by the site as returning user who is associated with activity on the site. In some embodiments, a computer session is considered terminated after a user logs off of a site (e.g., exits out of a window), logs into another site or opens a different window, or becomes inactive (or idle) on the site for a predetermined period of time. For example, after 30 minutes of idle time without computer user activity (e.g., not receiving any queries or clicks), particular embodiments automatically end a session. It is understood, however, that in a multi-device world, the conventional definition of a computer session is becoming increasingly inapplicable. Viewed more broadly, in some embodiments, a computer session includes the idea that the user is trying to achieve a particular task, with that task potentially spread over multiple devices and/or extended time period. The user could pick up a computer session on a different device, or after a lapse of time, and so forth. A user could have many parallel sessions going on simultaneously, for example. A session may include user phases, such as a discovery phase, an exploratory phase, a follow-up phase, and so forth.

In some embodiments, in response to block 903, some embodiments cause computer user activity to be recorded in a data record for the first computer session. In some embodiments, such functionality includes the functionality as described with respect to the session recording component 102 of FIG. 1. For example, in some embodiments, the recording of the computer user activity includes capturing a Document Object Model (DOM) of the first page, and serializing the DOM according an order that the computer user activity is performed, where the serializing corresponds to storing, in computer storage, a visual representation of each input, of the computer user activity, that the user has performed at the first page. For example, at block 903, in response to receiving an indication that the user logged into an application and produces the screenshot 400 of FIG. 4, particular embodiments record or store, in computer storage, each input the user makes, such as the values 402, 404, and 406 as well as the screenshot 400 itself, among other screenshots, which capture an in-video sequence of when and how the user interacted with the screenshot 400.

Per block 905, some embodiments extract a first value of a first field from the first page. A "value" as describe herein includes any numerical and/or natural language character and/or character sequence. And as described above, a "field" typically represents a category of data, typically indicated in natural language. For example, referring back to FIG. 4, the value 402 includes a sequence of numbers representing a credit card number. In some embodiments, block 905 includes the functionality as described with respect to the field extraction component 104 of FIG. 1, the field extraction model/layer 304 of FIG. 4, and/or the modified BERT model of FIG. 5. In some embodiments, "extracting" includes coping the first value from the first page to a data structure. In some embodiments, the "extracting" at block 905 alternatively or additionally includes "detecting," at the first page, a unique identifier associated with the user, where the unique identifier is the first value.

A "unique identifier" represents any suitable value associated with a user, such as a credit card number of the user, a phone number of the user, an email address of the user, a zip code that the user lives in, a residential address of the user, or the user's name. Unique identifiers tend to be unique or specific to a user, as opposed to generic values that are shared by other users or change considerably across computer sessions (e.g., an order total, an order date, or the name of the country or city a user lives in). For example, particular embodiments detect the value 123-4567 (e.g., via a machine learning model), which is the user's phone number. In some embodiments "extracting" at block 905 alternatively or additionally includes determining that the first value, of a plurality of values, includes a unique identifier associated with the user. For example, some embodiments determine or extract, via a modified BERT model, that the first value indicated above (i.e., 123-4567) is a phone number, as opposed to any other field.

Continuing with block 905, some embodiments detect an indication of a file attachment at the first page. In response to the detecting, some embodiments convert the file attachment into a machine-readable bitmap image. At least partially in response to the converting, some embodiments detect, at the machine-readable bitmap image, the first value, where the first value is included in the file attachment, and where the extracting of the first value is based at least in part on the detecting. Such functionality contemplates that a particular page may have embedded file attachments (e.g., PDFs), which are not machine-readable in their native form. As such, and as described with respect to the field extraction component 104 of FIG. 1, some embodiments perform OCR and other functionality to extract the corresponding content to make the content machine-readable.

In some embodiments, block 905 (or the "extracting" at block 905) includes or is preceded by the following functionality: in response to the receiving of the indication that the user has accessed the first page, particular embodiments generate a second score indicating whether the first field or first value in the first page corresponds to (e.g., matches) a predetermined field, where the extracting of the first value of the first field from the first page is based on the second score indicating that the first value or first field corresponds to the predetermined field. Such functionality is described herein with respect to term frequency-inverse document frequency (TF-IDF) or semantic similarity embodiments, where the "predetermined field" (e.g., a field name) is stored to computer storage and a determination is made whether the extracted first field or first value syntactically matches the predetermined field or is semantically similar with the predetermined field. In other words, in some embodiments, where there is a syntactic or semantic match, only then do particular embodiments extract the particular values or fields. This contemplates developer rules or conditions to only extract or select certain fields for hashing, such as those fields that are highly indicative of being unique or consistent across multiple computer sessions (e.g., credit card numbers), as opposed to those that are not (e.g., a date), as described herein.

In some embodiments, the "extracting" at block 905 is based on training a machine learning model to learn that each value, of a plurality of values, is indicative of being a constituent of a respective field, of a plurality of fields. In some embodiments, this includes functionality as described with respect to the modified BERT model of FIG. 5, which performs pre-training to understand natural language, and fine-tuning in order to predict a field type for a given value. In an illustrative example of the functionality of learning that a value is a constituent of (e.g., belongs to) a certain field, based on a model that is trained to recognize patterns of a credit card number (e.g., that it always has a certain type of character (numbers) and a certain quantity of numbers), the model learns that this value is a credit card, as opposed to a phone number, or the like.

In some embodiments, the first field (or any field described herein) is one of an email address, a zip code (e.g., as indicated by the value 406 of FIG. 4), a postal address (e.g., as indicated under the "Billing Address" of FIG. 4), a credit card number (as indicated by the value 402 of FIG. 4), a phone number (as indicated by the value 404 of FIG. 4), a username, and/or a natural language name (e.g., that directly identifies a user).

Per block 907, some embodiments cause a first hash (e.g., a one-way hash) to be computed (e.g., at least partially responsive to the extracting at block 905), where the first hash at least partially represents the first value. For example, referring back to FIG. 4, the credit card value 402 is hashed to v66si6t. In some embodiments, block 907 includes any of the functionality as described with respect to the value anonymization component 102 of FIG. 1, the combined hash 204 of FIG. 2, the single phone hash 210 of FIG. 2, and/or the anonymization model/layer 306 of FIG. 3.

It is understood that a value need not be necessarily hashed, but any suitable anonymization can occur on a value, such as obfuscation, encryption, masking, or the like. For example, in some embodiments, at least partially responsive to the detecting, at the first page, of a unique identifier, some embodiments cause a first anonymized value to be computed, where the first anonymized value at least partially represents the unique identifier. For instance a full credit card number can be masked or hidden, except the last 4 digits. In another example, at least partially responsive to determining that a first value of a plurality of values, includes a unique identifier associated with a user, in some embodiments, causing an anonymization of the unique identifier Z.

In some embodiments, the first hash "at least partially represents the first value" because the first hash only represents the first value (e.g., as illustrated by the phone hash 210 of FIG. 2) in some embodiments, or in other embodiments, the first hash not only represents/includes the first value, but includes hashes of other field values as well (e.g., as illustrated by the combined hash 204 of FIG. 2). For example, some embodiments extract a third value of a second field from the first page. Responsive to the extracting of the third value, some embodiments cause the first hash to be computed by combining a first sub-hash representing the first value and a second sub-hash representing the third value. Some embodiments also extract a fourth value from the second page. And responsive to the extracting of the fourth value, some embodiments cause the second hash to be computed by combining a third sub-hash representing the second value and a fourth sub-hash representing the fourth value. All of this functionality is described in FIG. 2, specifically the computer session 220. A "sub-hash" is any individual hash of a particular value that belongs to a particular field. A "sub-hash" is also part of a larger combined hash. For example, in FIG. 2, a "sub-hash" of the phone number 123-4567 is 3XTac4TL, which, in some embodiments, is included in the combined hash 204. In another example, each of the hashes illustrated in FIG. 4 is a sub-hash in some embodiments. In this way, in some embodiments, the first hash of block 907 represents a concatenation of each value of a plurality of fields of the first page or alternatively represents only the first value.

In some embodiments, the first hash (and/or the second hash) is a one-way hash, as described herein. In some embodiments, the first hash (and/or the second hash) is computed at a user device associated with the user. As described herein, this has a technical effect of computer security, as no plaintext value will be transmitted, over a network, to a server.

Per block 909, some embodiments receive another indication that at least a second page has been accessed, where the access of the second page occurs during a second computer session. For example, a week later after a user accessed the first page, the same or different user may have accessed a page of the same computer application as the first page or a different computer application. It is understood, however, that in some embodiments, that the access of the second page alternatively occurs during the same first computer session. In other words, in some embodiments, the process 900 occurs for different pages accessed during the same computer session, as opposed to different computer sessions.

As described herein, one technical solution is that page values or fields can be captured in any subsequent computer session even if the user is using a different device or platform. For example, in some embodiments, the first page accessed during the first computer session represents an app page included in a mobile application and the second page accessed during the second computer session is a web page that is included in a web application. Further, in some embodiments, the user accessed the mobile application with a mobile device (e.g., a smartphone) during the first computer session and the user accessed the web application via a browser at a different computing device (e.g., a laptop or desktop) than the mobile device. This indicates the technical effect of embodiments being platform and device agnostic for better accuracy and scalability for user tracking, as described herein.

Per block 911, some embodiments extract a second value from the second page. In some embodiments, such "extraction" at block 911 includes or represents identical functionality as described with respect to the extraction at block 905. In some embodiments, such extraction at block 911 includes the functionality as described with respect to the field extraction component 104 of FIG. 1, the field extraction model/layer 304 of FIG. 3, or the modified BERT model of FIG. 5. Per block 913, some embodiments cause a second hash (or anonymized value) to be computed (e.g., at least partially responsive to the extracting of the second value), where the second hash at least partially represents the second value. In some embodiments, block 913 represents identical functionality as described with respect to block 907. In some embodiments, block 913 includes the functionality as described with respect to the value anonymization component 106 of FIG. 1, or the anonymization model/layer 306 of FIG. 3.

Per block 915, based at least in part on a comparison between the first hash and the second hash (or a first anonymized value with a second anonymized value), some embodiments generate a score indicating a probability that a same user has accessed both the first page and the second page. In some embodiments, block 915 represents or includes the functionality as described with respect to the user-computer session stitching component 108 of FIG. 1, the user-computer session stitching model/layer 308 of FIG. 3, or the inference predictions 609 of the neural network 605 of FIG. 6.

In some embodiments, the "score" includes or alternatively partially indicates a probability that the user (that accessed the first page) also accessed the second page. In other words, this captures a probability that a current user that accessed content in the second computer session is the same user that accessed content during the first computer session. In some embodiments, the "score" includes or alternatively partially indicates that the user accessed content in both the first computer session and second computer session regardless, for example, of the individual pages the user has accessed. In some embodiments, the "score" is directly indicative of a confidence level or probability (e.g., 95%) produced by a probability model. In alternative or additional embodiments, the "score" indicates a particular distance (e.g., Euclidian distance) between feature vectors, as described herein. In some embodiments, the "score" alternatively or additionally represents a machine learning prediction output, such as a classification probability of a particular user class (for classifiers), or probability that a data point (representing the second page or second computer session) belongs to a particular cluster representing a particular user (e.g., for K-means clustering).

In some embodiments, the "comparison" at block 915 includes or alternatively represents comparing the first anonymized value (or first anonymized unique identifier) with the second anonymized value (or second anonymized unique identifier), where the second anonymized value at least partially represents another unique identifier that was derived during access of the second page or input (e.g., by a user) at the second page during the second computer session. In an example illustration of such comparison, referring back to FIG. 2, particular embodiments compare the hash 3XTac4TL (the phone number hash) extracted during the computer session 220 and as part of the hash 204, with the hash 210, which is the same exact value. Accordingly, based on the hash values matching, particular embodiments generate a higher score indicating a high probability that the same user accessed content in both the computer session 220 and the computer session 230.

In some embodiments, the generating of the score at block 915 is based on training a machine learning model (e.g., as illustrated by the process 800 of FIG. 8) to learn whether different computer sessions (and/or pages) were engaged by a same user. In some embodiments, this includes the functionality as described with respect to the process 800 or the neural network 605 of FIG. 6. For example, the "score" in particular embodiments includes or represents a prediction that the current user of the current computer session (e.g., the second computer session or the one who accessed the second page) is the same user that accessed the first page or other content in past computer sessions (e.g., the first computer session) based on training a model.

In some embodiments, after the score is generated at block 915 and after a recording of computer user activity of the first and second pages (e.g., via CLARITY), some embodiments cause at least one of: a targeted advertisement to be transmitted to a user device associated with the user, a fraud detection report to be generated, and store, in computer storage, user preferences based on retrieving a record that includes the computer user activity and the score.

In an illustrative example of the targeted advertisement embodiments, based on the score indicating a high probability that the same user accessed the first page and the second page, particular embodiments then analyze the computer user activity to determine that the user bought several merchandising items that included a pro football team name and logo. Accordingly, particular embodiments cause presentation of an ad (e.g., at the second page or during the second computer session) for purchase of a product with the same pro football team name and logo by communicating, over the network(s) 110 of FIG. 1, to a publication server so that the publication server may directly provide the ad.

In another example illustration of the fraud detection embodiments, based on the score indicating a high probability score that the first page is highly associated with fraud (e.g., based on an IP address of the user device that accessed the first page being subject to past fraud findings) and the score at block 915 indicating that the same user accessed the second page, particular embodiments then cause a notification to be presented to an administrator device, which indicates that the transaction or computer user activity that occurred at the second page is likely fraudulent. In yet another example of user preferences, based on the score indicating a high probability that the same user accessed the first page and the second page, particular embodiments then analyze the computer user activity to determine that the user has indicating a preference for a weather pagelet to be presented. Accordingly, particular embodiments cause presentation, during the second computer session or at the second page, of the weather pagelet. It is understood that these actions are representative only and that any suitable action can occur (e.g., during the second computer session) based on the score and computer user activity, such as determining who is a new and returning visitor, tracking user behavior for analytics, storing items in shopping baskets based on previous computer session actions, storing log-in details, and the like.

Embodiments of the disclosure may be described in the general context of computer code or machine-useable instructions, including computer-useable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

Other Embodiments

In some embodiments, a computerized system, such as the computerized system described in any of the embodiments above, comprise at least one computer processor, one or more computer storage media storing computer-useable instructions that, when used by the at least one computer processor, cause the at least one computer processor to perform operations. The operations comprise: receiving an indication that a user has accessed a first web or app page of a first computer application, the access of the first web or app page occurring during a first computer session; extracting a first value of a first field from the first web or app page; at least partially responsive to the extraction, causing a first hash to be computed, the first hash at least partially represents the first value; receiving another indication that at least a second web or app page of the first computer application or another computer application has been accessed, the access of the second page occurring during a second computer session; extracting a second value from the second web or app page; at least partially responsive to the extraction of the second value, causing a second hash to be computed, the second hash at least partially represents the second value, wherein the first hash and the second hash preserves a privacy of one or more users; and based at least in part on a comparison between the first hash and the second hash, generating a score indicating a probability that a same user accessed both the first web or app page and the second web or app page.

Advantageously, these and other embodiments of the computerized system, as described herein, have the technical effects of improved process security, improved accuracy or error rate reduction for tracking users, increased scalability, improved human interaction, and improved computer resource consumption, among other technical effects, as described in more detail herein.

In any combination of the above embodiments of the computerized system the operations further comprise: detecting an indication of a file attachment at the first web or app page; in response to the detection, converting the file attachment into a machine-readable bitmap image; and at least partially in response to the conversion, detecting, at the machine-readable bitmap image, the first value, and wherein the first value is included in the file attachment, and wherein the extracting of the first value is based at least in part on the detecting.

In any combination of the above embodiments of the computerized system, the operations further comprise: extracting a third value of a second field from the first web or app page; responsive to the extraction of the third value, causing the first hash to be computed by combining a first sub-hash representing the first value and a second sub-hash representing the third value; extracting a fourth value from the second page; and responsive to the extraction of the fourth value, causing the second hash to be computed by combining a third sub-hash representing the second value and a fourth sub-hash representing the fourth value.

In any combination of the above embodiments of the computerized system, the first hash represents one of a concatenation of each value of a plurality of fields of the first web or app page or only the first value.

In any combination of the above embodiments of the computerized system, the operations further comprise: in response to receiving the indication that the user has accessed the first web or app page of the first computer application, generating a second score indicating whether each field or value in the first web or app page corresponds to a predetermined field, wherein the extraction of the first value of the first field from the first web or app page is based on the second score indicating that the first value or first field corresponds to the predetermined field.

In any combination of the above embodiments of the computerized system, the extraction of the first value of a first field from the first web or app page is based on training a machine learning model to learn that each value, of a plurality of values, is indicative of being a constituent of a respective field, of a plurality of fields.

In any combination of the above embodiments of the computerized system, the first field includes one of an email address, a zip code, a postal address, a credit card number, a phone number, a user name, or a natural language name.

In any combination of the above embodiments of the computerized system, the generating of the score is based on training a machine learning model to learn whether different computer sessions were engaged by a same user.

In any combination of the above embodiments of the computerized system, the first web or app page is a part of a mobile application, and wherein the second web or app page is a part of a web application, and wherein the user accessed the mobile application with a mobile device, and wherein the user accessed the web application via a browser at a different computing device than the mobile device.

In any combination of the above embodiments of the computerized system, the operations further comprise: in response to the receiving of the indication that the user has accessed the first web or app page of the first computer application, causing the computer user activity to be recorded in a data record for the first computer session, the data record excluding a cookie.

In any combination of the above embodiments of the computerized system, the recording of the computer user activity includes capturing a Document Object Model (DOM) of the first web or app page, and serializing the DOM according to an order that the computer user activity is performed, and wherein the capturing of the DOM and the serializing corresponds to storing, in computer storage, a visual representation of each input, of the computer user activity, that a user performed at the first web or app page.

In any combination of the above embodiments of the computerized system, the operations further comprise: based on retrieving the record and the generating of the score, causing at least one of a targeted advertisement to be transmitted to a user device associated with the user, a fraud detection report to be generated, and store, in computer storage, user preferences.

In any combination of the above embodiments of the computerized system, each of the first hash and the second hash is a one-way hash, and wherein each of the one-way hashes is computed at a user device associated with the user.

In some embodiments, a computer-implemented method, such as the computer-implemented method described in any of the embodiments above, comprises: receiving an indication that a user has accessed a first page of a first computer application, the access of the first page occurring during a first computer session via a first user device associated with the user; detecting, at the first page, a first unique identifier associated with the user; at least partially responsive to the detection, causing a first anonymized value to be computed, the first anonymized value at least partially represents the unique identifier, wherein the anonymized value preserves the user's privacy; comparing the first anonymized value with a second anonymized value, the second anonymized value at least partially representing a second unique identifier that was derived during access of a second page; and based at least in part on the comparison, generating a score that at least partially indicates a probability that the user accessed the second page.

Advantageously, these and other embodiments of the computer-implemented method, as described herein, have the technical effects of improved process security, improved accuracy or error rate reduction for tracking users, increased scalability, improved human interaction, and improved computer resource consumption, among other technical effects, as described in more detail herein.

In any combination of the above embodiments of the computer-implemented method, the computer-implemented method further comprises: detecting, at the first page, a third unique identifier; responsive to the detection of the third unique identifier, causing the first anonymized value to be computed by combining a first sub-hash representing the first unique identifier and a second sub-hash representing the third unique identifier; detecting, at the second page, a fourth unique identifier; and responsive to the detection of the fourth unique identifier, causing the second anonymized value to be computed by combining a third sub-hash representing the second unique identifier and a fourth sub-hash representing the fourth unique identifier.

In any combination of the above embodiments of the computer-implemented method, the first anonymized value represents one of a concatenation of each value of a plurality of unique identifiers of the first page or only the first unique identifier.

In any combination of the above embodiments of the computer-implemented method, the detecting of the first unique identifier is based on training a machine learning model to learn that the first unique identifier is indicative of being a constituent of a particular field, of a plurality of fields.

In any combination of the above embodiments of the computer-implemented method, the first unique identifier includes one of an email address, a zip code, a postal address, a credit card number, a phone number, a user name, or a natural language name.

In any combination of the above embodiments of the computer-implemented method, the generating of the score is based on training a machine learning model to learn whether different computer sessions were engaged in by a same user.

In some embodiments, one or more computer storage media, such as the one or more computer storage media described in any of the embodiments above, comprises computer-executable instructions embodied thereon that, when executed, by one or more processors, cause the one or more processors to perform operations comprising: receiving an indication that a first page of a first computer application has been accessed, the first page including a plurality of values, the access of the first page being included in a first computer session; determining that a first value, of the plurality of values, includes a unique identifier associated with a user; causing an anonymization of the unique identifier, wherein the anonymization of the unique identifier preserves the user's privacy; comparing the anonymized unique identifier with a second anonymized unique identifier, the second anonymized unique identifier representing a value input at a second page during a second computer session; and based at least in part on the comparison, generating a score indicating a probability that the user accessed content in both the first computer session and second computer session.

Advantageously, these and other embodiments of the computer storage media, as described herein, have the technical effects of improved process security, improved accuracy or error rate reduction for tracking users, increased scalability, improved human interaction, and improved computer resource consumption, among other technical effects, as described in more detail herein.

Example Computing Architecture and Device

Figure 10:
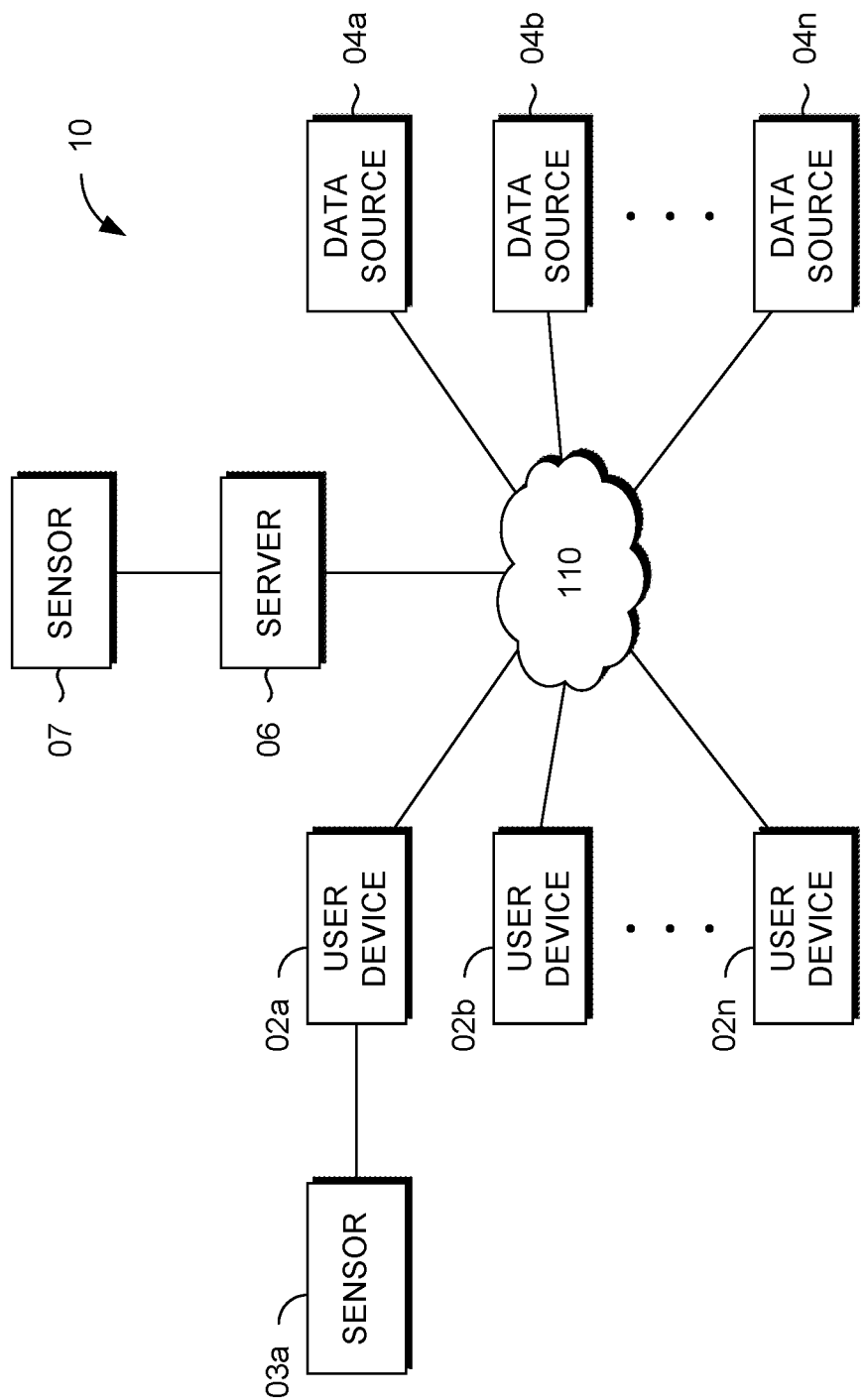
FIG. 10 is a block diagram illustrating an example operating environment suitable for implementing some embodiments of the disclosure.

Turning now to FIG. 10, a block diagram is provided showing an example operating environment 10 in which some embodiments of the present disclosure may be employed. It should be understood that this and other arrangements described herein are set forth only as examples. Other arrangements and elements (for example, machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 10 includes a number of user devices, such as user devices 02a and 02b through 02n; a number of data sources (for example, databases or other data stores, such as 105), such as data sources 04a and 04b through 04n; server 06; sensors 03a and 07; and network(s) 110. It should be understood that environment 10 shown in FIG. 10 is an example of one suitable operating environment. Each of the components shown in FIG. 10 may be implemented via any type of computing device, such as computing device 11 as described in connection to FIG. 11, for example. These components may communicate with each other via network(s) 110, which may include, without limitation, a local area network (LAN) and/or a wide area networks (WAN). In some implementations, network(s) 110 comprises the Internet and/or a cellular network, amongst any of a variety of possible public and/or private networks.

It should be understood that any number of user devices, servers, and data sources may be employed within operating environment 10 within the scope of the present disclosure. Each may comprise a single device or multiple devices cooperating in a distributed environment. For instance, server 06 may be provided via multiple devices arranged in a distributed environment that collectively provide the functionality described herein. Additionally, other components not shown may also be included within the distributed environment.

User devices 02a and 02b through 02n can be client devices on the client-side of operating environment 10, while server 06 can be on the server-side of operating environment 10. Server 06 can comprise server-side software designed to work in conjunction with client-side software on user devices 02a and 02b through 02n so as to implement any combination of the features and functionalities discussed in the present disclosure. This division of operating environment 10 is provided to illustrate one example of a suitable environment, and there is no requirement for each implementation that any combination of server 06 and user devices 02a and 02b through 02n remain as separate entities. In some embodiments, the one or more servers 06 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the one or more network(s) 110.

In some embodiments, a user device 02a or server 06 alternatively or additionally comprises one or more web servers and/or application servers to facilitate delivering web or online content to browsers installed on a user device 02b. Often the content may include static content and dynamic content. When a client application, such as a web browser, requests a website or web application via a URL or search term, the browser typically contacts a web server to request static content or the basic components of a website or web application (for example, HTML pages, image files, video files, and the like). Application servers typically deliver any dynamic portions of web applications or business logic portions of web applications. Business logic can be described as functionality that manages communication between a user device and a data store (for example, a database). Such functionality can include business rules or workflows (for example, code that indicates conditional if/then statements, while statements, and the like to denote an order of processes).

User devices 02a and 02b through 02n may comprise any type of computing device capable of use by a user. For example, in one embodiment, user devices 02a through 02n may be the type of computing device described in relation to FIG. 11 herein. By way of example and not limitation, a user device may be embodied as a personal computer (PC), a laptop computer, a mobile phone or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 04a and 04b through 04n may comprise data sources and/or data systems, which are configured to make data available to any of the various constituents of operating environment 10 or system 100 described in connection to FIG. 1. Examples of data source(s) 04a through 04n may be one or more of a database, a file, data structure, corpus, or other data store. Data sources 04a and 04b through 04n may be discrete from user devices 02a and 02b through 02n and server 06 or may be incorporated and/or integrated into at least one of those components. In one embodiment, data sources 04a through 04n comprise sensors (such as sensors 03a and 07), which may be integrated into or associated with the user device(s) 02a, 02b, or 02n or server 06.

In some embodiments, operating environment 10 is utilized to implement one or more of the components of the system 100, described in FIG. 1, including components for generating a score indicating whether a same user accessed multiple sessions, as described herein. Operating environment 10 also can be utilized for implementing aspects of processes 800 (FIG. 8), 900 (FIG. 9) and/or any other functionality as described in connection with FIGS. 1-9.

Figure 11:
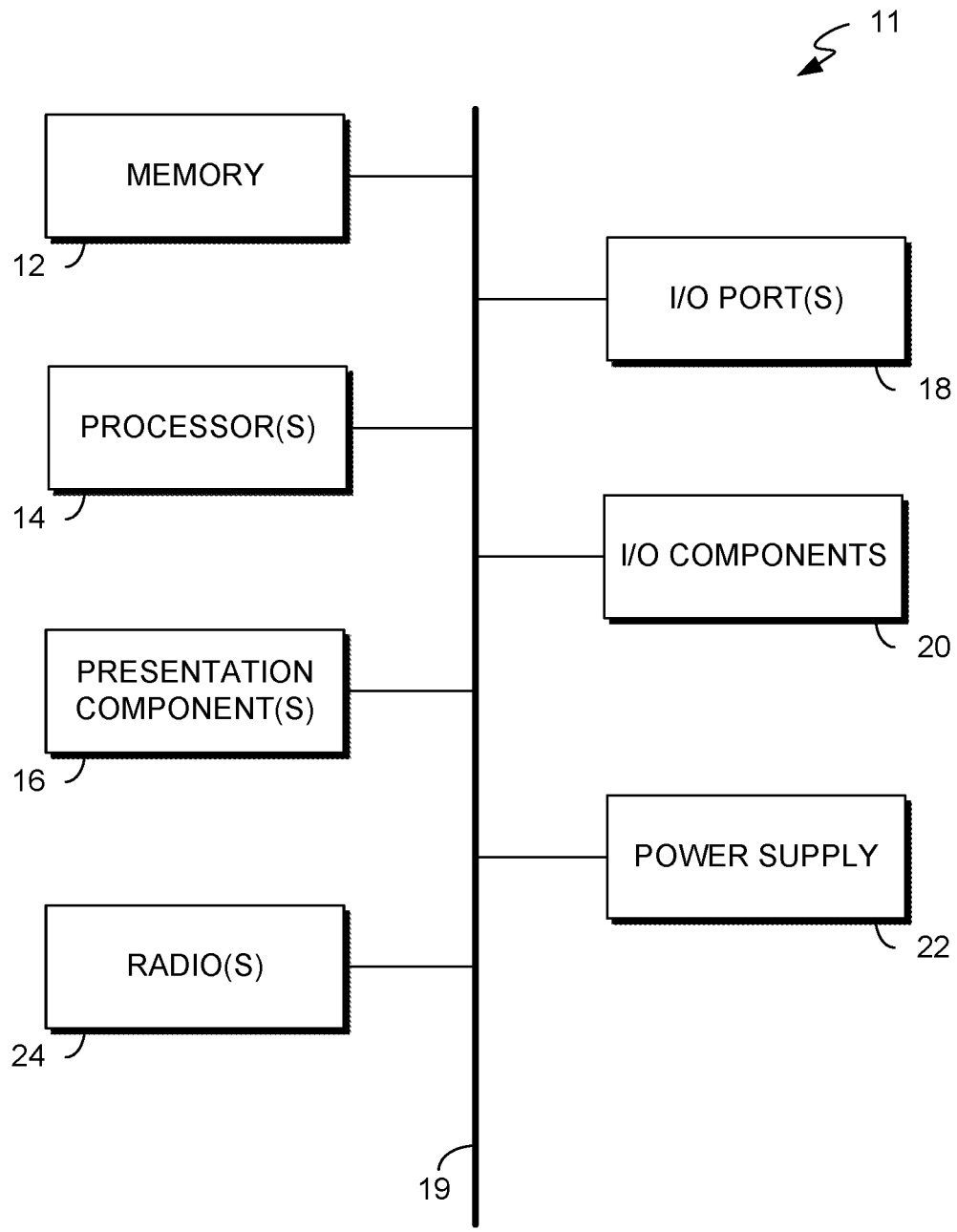
FIG. 11 is a block diagram of an example computing device suitable for use in implementing some embodiments described herein.

Having described various implementations, an exemplary computing environment suitable for implementing embodiments of the disclosure is now described. With reference to FIG. 11, an exemplary computing device is provided and referred to generally as computing device 11. The computing device 11 is but one example of a suitable computing environment and is not intended to suggest any limitation as to the scope of use or functionality of embodiments of the disclosure. Neither should the computing device 11 be interpreted as having any dependency or requirement relating to any one or combination of components illustrated.

Turning to FIG. 11, computing device 11 includes a bus 19 that directly or indirectly couples the following devices: memory 12, one or more processors 14, one or more presentation components 16, one or more input/output (I/O) ports 18, one or more I/O components 20, and an illustrative power supply 22. Bus 19 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 11 and with reference to "computing device."

Computing device 11 typically includes a variety of computer-readable media. Computer-readable media can be any available media that can be accessed by computing device 11 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 11. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 11 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 11 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 11. The computing device 11 may be equipped with depth cameras, such as stereoscopic camera systems, infrared camera systems, RGB camera systems, and combinations of these, for gesture detection and recognition. Additionally, the computing device 11 may be equipped with accelerometers or gyroscopes that enable detection of motion. The output of the accelerometers or gyroscopes may be provided to the display of the computing device 11 to render immersive augmented reality or virtual reality.

Some embodiments of computing device 11 may include one or more radio(s) 24 (or similar wireless communication components). The radio 24 transmits and receives radio or wireless communications. The computing device 11 may be a wireless terminal adapted to receive communications and media over various wireless networks. Computing device 11 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (for example, mobile hotspot) that provides access to a wireless communications network, such as a WLAN connection using the 802.11 protocol, a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions, and the like) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

As used herein, the term "set" may be employed to refer to an ordered (i.e., sequential) or an unordered (i.e., non-sequential) collection of objects (or elements), such as but not limited to data elements (for example, events, clusters of events, and the like). A set may include N elements, where N is any non-negative integer. That is, a set may include 1, 2, 3, . . . N objects and/or elements, where N is an positive integer with no upper bound. Therefore, as used herein, a set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

The invention claimed is:

1. A system comprising:
   at least one computer processor; and
   one or more computer storage media storing computer-useable instructions that, when used by the at least one computer processor, cause the at least one computer processor to perform operations comprising:
      receiving an indication that a user has accessed a first web or app page of a first computer application, the access of the first web or app page occurring during a first computer session;
      in response to receiving the indication that the user has accessed the first web or app page of the first computer application, generating a first score indicating whether each field or value in the first web or app page corresponds to a predetermined field;
      based at least in part on the first score indicating that a first value or first field corresponds to the predetermined field, extracting the first value of the first field from the first web or app page;
      at least partially responsive to the extraction of the first value, causing a first hash to be computed, the first hash at least partially represents the first value;
      receiving another indication that at least a second web or app page of the first computer application or another computer application has been accessed, the access of the second web or app page occurring during a second computer session;
      extracting a second value from the second web or app page;
      at least partially responsive to the extraction of the second value, causing a second hash to be computed, the second hash at least partially represents the second value, wherein the first hash and the second hash preserves a privacy of one or more users; and
      based at least in part on a comparison between the first hash and the second hash, generating a second score indicating a probability that a same user accessed both the first web or app page and the second web or app page.

2. The system of claim 1, wherein the operations further comprise:
   detecting an indication of a file attachment at the first web or app page;
   in response to the detection, converting the file attachment into a machine-readable bitmap image; and
   at least partially in response to the conversion, detecting, at the machine-readable bitmap image, the first value, and wherein the first value is included in the file attachment, and wherein the extracting of the first value is based at least in part on the detecting.

3. The system of claim 1, wherein the operations further comprise:
   extracting a third value of a second field from the first web or app page;
   responsive to the extraction of the third value, causing the first hash to be computed by combining a first sub-hash representing the first value and a second sub-hash representing the third value;
   extracting a fourth value from the second web or app page; and
   responsive to the extraction of the fourth value, causing the second hash to be computed by combining a third sub-hash representing the second value and a fourth sub-hash representing the fourth value.

4. The system of claim 1, wherein the first hash represents one of a concatenation of each value of a plurality of fields of the first web or app page or only the first value.

5. The system of claim 1, wherein the extraction of the first value of a first field from the first web or app page is based on training a machine learning model to learn that each value, of a plurality of values, is indicative of being a constituent of a respective field, of a plurality of fields.

6. The system of claim 1, wherein the first field includes one of an email address, a zip code, a postal address, a credit card number, a phone number, a user name, or a natural language name.

7. The system of claim 1, wherein the generating of the second score is based on training a machine learning model to learn whether different computer sessions were engaged by a same user.

8. The system of claim 1, wherein the first web or app page is a part of a mobile application, and wherein the second web or app page is a part of a web application, and wherein the user accessed the mobile application with a mobile device, and wherein the user accessed the web application via a browser at a different computing device than the mobile device.

9. The system of claim 1, wherein the operations further comprise:
in response to the receiving of the indication that the user has accessed the first web or app page of the first computer application, causing the computer user activity to be recorded in a data record for the first computer session, the data record excluding a cookie.

10. The system of claim 9, wherein the recording of the computer user activity includes capturing a Document Object Model (DOM) of the first web or app page, and serializing the DOM according to an order that the computer user activity is performed, and wherein the capturing of the DOM and the serializing corresponds to storing, in computer storage, a visual representation of each input, of the computer user activity, that a user performed at the first web or app page.

11. The system of claim 9, wherein the operations further comprise:
based on retrieving the record and the generating of the second score, causing at least one of a targeted advertisement to be transmitted to a user device associated with the user, a fraud detection report to be generated, and store, in computer storage, user preferences.

12. The system of claim 1, wherein each of the first hash and the second hash is a one-way hash, and wherein each of the one-way hashes is computed at a user device associated with the user.

13. A computer-implemented method comprising:
receiving an indication that a user has accessed a first page of a first computer application, the access of the first page occurring during a first computer session via a first user device associated with the user;
in response to receiving the indication that the user has accessed the first page of the first computer application, generating a first score indicating whether a first field or first value in the first page corresponds to a predetermined field;
based at least in part on the first score indicating that the first value or first field corresponds to the predetermined field, detecting, at the first page, a first unique identifier associated with the user;
at least partially responsive to the detection, causing a first anonymized value to be computed, the first anonymized value at least partially represents the first unique identifier, wherein the anonymized value preserves the user's privacy;
comparing the first anonymized value with a second anonymized value, the second anonymized value at least partially representing a second unique identifier that was derived during access of a second page; and
based at least in part on the comparison, generating a second score that at least partially indicates a probability that the user accessed the second page.

14. The computer-implemented method of claim 13, further comprising:
detecting, at the first page, a third unique identifier;
responsive to the detection of the third unique identifier, causing the first anonymized value to be computed by combining a first sub-hash representing the first unique identifier and a second sub-hash representing the third unique identifier;
detecting, at the second page, a fourth unique identifier; and
responsive to the detection of the fourth unique identifier, causing the second anonymized value to be computed by combining a third sub-hash representing the second unique identifier and a fourth sub-hash representing the fourth unique identifier.

15. The computer-implemented method of claim 13, wherein the first anonymized value represents one of a concatenation of each value of a plurality of unique identifiers of the first page or only the first unique identifier.

16. The computer-implemented method of claim 13, wherein the detecting of the first unique identifier is based on training a machine learning model to learn that the first unique identifier is indicative of being a constituent of a particular field, of a plurality of fields.

17. The computer-implemented method of claim 13, wherein the first unique identifier includes one of an email address, a zip code, a postal address, a credit card number, a phone number, a user name, or a natural language name.

18. The computer-implemented method of claim 13, wherein the generating of the second score is based on training a machine learning model to learn whether different computer sessions were engaged in by a same user.

19. One or more computer storage media having computer-executable instructions embodied thereon that, when executed, by one or more processors, cause the one or more processors to perform operations comprising:
receiving an indication that a first page of a first computer application has been accessed, the first page including a plurality of values, the access of the first page being included in a first computer session;
in response to receiving the indication that the first page of the first computer application has been accessed, generating a first score indicating whether a first field or first value in the first page corresponds to a predetermined field;
based at least in part on the first score indicating that the first value or first field corresponds to the predetermined field, determining that the first value, of the plurality of values, includes a unique identifier associated with a user;
causing an anonymization of the unique identifier, wherein the anonymization of the unique identifier preserves the user's privacy;
comparing the anonymized unique identifier with a second anonymized unique identifier, the second anonymized unique identifier representing a value input at a second page during a second computer session; and
based at least in part on the comparison, generating a second score indicating a probability that the user accessed content in both the first computer session and second computer session.

* * * * *